(12) United States Patent
Kurokawa et al.

(10) Patent No.: US 6,192,019 B1
(45) Date of Patent: Feb. 20, 2001

(54) DISC PLAYER

(75) Inventors: Yusuke Kurokawa; Akeshi Shitamichi, both of Tokyo; Eiji Shinohara, Kawasaki; Kunio Kido, Tokyo, all of (JP)

(73) Assignee: Tanashin Denki Co., Ltd., Tokyo (JP)

( * ) Notice: Under 35 U.S.C. 154(b), the term of this patent shall be extended for 0 days.

(21) Appl. No.: 09/199,471

(22) Filed: Nov. 25, 1998

(30) Foreign Application Priority Data

Nov. 29, 1997 (JP) ................................................. 9-344380

(51) Int. Cl.[7] .......................... G11B 17/04; G11B 33/02
(52) U.S. Cl. ............................................. 369/77.1; 369/75.2
(58) Field of Search .................................... 364/75.1–77.2

(56) References Cited

U.S. PATENT DOCUMENTS

| | | | |
|---|---|---|---|
| 4,507,768 | * 3/1985 | Ikedo et al. | 369/77.1 |
| 4,674,079 | * 6/1987 | Agostini | 369/77.1 |
| 5,260,925 | * 11/1993 | Camps et al. | 369/77.1 |
| 5,355,358 | * 10/1994 | Alfen | 369/77.1 |
| 5,719,844 | * 2/1998 | Abe | 369/77.1 |
| 5,737,293 | * 4/1998 | Kawamura et al. | 369/77.1 |
| 5,872,756 | * 2/1999 | Shime | 369/77.1 |
| 5,878,011 | * 3/1999 | Nakamichi | 369/75.2 |

FOREIGN PATENT DOCUMENTS

| | | |
|---|---|---|
| 6337853 | 2/1988 | (JP) . |
| 9237455 | 9/1997 | (JP) . |

* cited by examiner

*Primary Examiner*—William Klimowicz
(74) *Attorney, Agent, or Firm*—Dickinson Wright PLLC

(57) ABSTRACT

This invention provides a disc player in which a disc can be taken out readily and without possibility for the disc to fall out when unloading the disc. A Transfer apparatus pushes back a disc located in a playing portion up to a position, at which the center hole of the disc at least partly projects from a disc insertion slot. An elastic holding mechanism elastically holds a portion of the disc, having been pushed back, on the outer side of a recording area from the opposite sides of the disc, thus preventing the falling-out of the disc.

5 Claims, 25 Drawing Sheets

FIG. 22
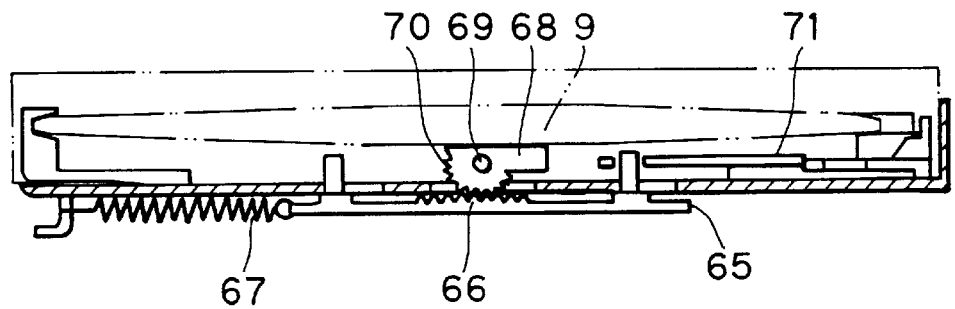
FIG. 23
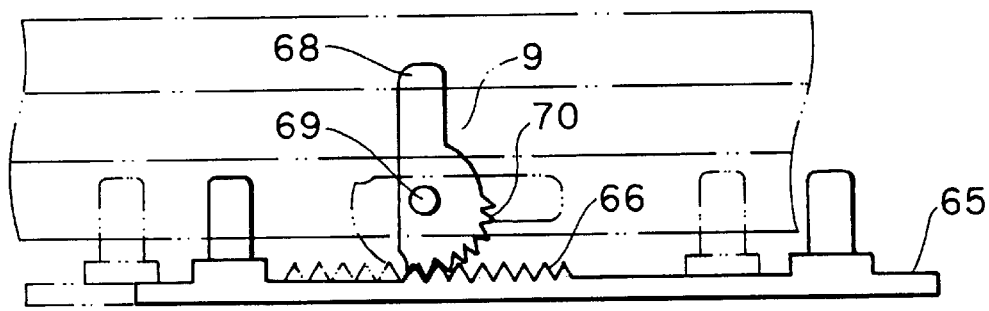
FIG. 24
|  | Disc Loading | Disc Take-out |
|---|---|---|
| First Switch (42a) | ON — a ↓ OFF | ON f ↓ OFF |
| Second Switch (42b) | ON b↓ c↓ OFF | ON e↓ g↓ OFF |
| Motor (19) | Rotate Stop | Rotate d↓ Stop |

DISC PLAYER

BACKGROUND OF THE INVENTION

1. Field of the Invention

This invention relates to a disc player, which permits readily taking out disc and is small in size.

2. Description of the Prior Art

Japanese Patent Disclosure No. 9-237455 proposes a disc player which has a playing portion disposed near a disc insertion slot for playback with a disc at a position, which is assumed when the entire disc is inserted slightly from the disc insertion slot. In this disc player, the disc is transferred by rotation of a transfer roller while the disc is held between a disc guide plate and the transfer roller.

Disposing the playing portion near the disc insertion slot as in this case, is effective for the size reduction of the disc player. Besides, doing so has another effect that the disc inserted from the disc insertion slot can be quickly transferred to the playing portion.

However, the transfer means transfers the inserted disc to the playing portion and also transfers the disc from the playing portion to a take-out position, is of roller type. Therefore, it is possible that the recording area of the disc is damaged or contaminated by the roller surface in contact with the recording area.

Japanese Patent Disclosure No.63-37853 shows a structure, in which a disc is transferred by pushing the edge of the disc. With this type, unlike the roller type, the recording area of the disc is neither damaged nor contaminated.

In the meantime, if the transfer means can push back the disc from the playing portion toward the disc insertion slot up to a position, at which the center hole of the disc projects to the outside, the disc can be readily taken out by inserting fingers into its center hole. Also, if the transfer means can push back the disc even up to a position, at which the center hole of the disc is exposed not entirely but partly to the outside, the disc can be readily taken out by holding the disc on the inner side thereof other than the recording area from the opposite sides with fingers. With the structure disclosed in the Japanese Patent Disclosure No. 63-37853, however, if the disc is pushed back by more than one half or at a high transfer speed, it is possible that the disc gets out to the outside.

In the use of the disc player particularly as a car-mounted one, the getting-out of the disc will pose a driver's danger that the driver's attention for driving is made loose by picking up the got-out disc. For this reason, hitherto the disc could not be pushed back so much. Consequently, it was difficult to take out the disc having been pushed back by the transfer means.

SUMMARY OF THE INVENTION

An object of the present invention is to provide a disc player, which is adapted to let, for size reduction, a disc to be played at a position assumed by the disc when the entirety thereof is inserted slightly from the disc insertion slot, and which permits transfer of the disc without damaging or contaminating the recording area of the disc, and is adapted, for ready take-out of the disc in the unloading thereof, to push back the disc up to a position, at which the center hole of the disc at least partly projects from the disc insertion slot, without possibility for the disc to get out to the outside.

According to the invention, for size reduction, a playing portion is disposed near the disc insertion slot for playback with a disc at a position assumed when the entirety thereof is inserted slightly from the disc insertion slot. Transfer means pushes back the edge of the disc in the paying portion up to a position, at which the center hole of the disc at least partly projects from the disc insertion slot. An elastic holding mechanism is adapted to elastically hold the disc, which has been pushed back by the transfer means from the playing portion toward the disc insertion slot, on the outer side of the recording area of the disc from the opposite sides of the disc, so that the disc is positively prevented from getting out to the outside.

By this arrangement, the transfer means transfers the disc by pushing the outer periphery thereof, which causes no danger of damaging or contaminating the recording area of the disc. Further, when the disc is pushed back by the transfer means, the disc is elastically held by the elastic holding mechanism, so that the disc can not get out to the outside although the disc has been pushed back by more than one half, and the disc as pushed back can be easily taken out by holding the disc on the inner side thereof other than the recording area or by inserting fingers into its center hole.

The elastic holding mechanism serving as above should be disposed at a restricted position. Specifically, the elastic holding mechanism should be disposed at a position to be able to hold the disc at a position thereof, to which the disc has been pushed back by the transfer means, as well as being out of contact with the disc during playback and also out of contact with the recording area of the disc being transferred. However, the restriction on the disposing position of the elastic holding mechanism is considerably stringent particularly in the case of disposing the playing portion near the disc insertion slot for playback with the disc at the position assumed when the entirety thereof is inserted slightly from the disc insertion slot.

Accordingly, an elastic retainer having an inclined surface relative to the plane of the disc, may be used to retain the edge of the disc, having been pushed back by the transfer means, with the inclined surface. This arrangement permits increasing the scope of selection of the disposing position of the elastic holding mechanism, and hence increasing the degree of freedom of design.

Particularly, formation of the elastic retainer to be integral with a synthetic resin portion in the neighborhood of the disc insertion slot, permits reducing the number of components and hence reducing the cost of manufacture.

Also, the elastic holding mechanism may have a pair of elastic retainers disposed symmetrically on the opposite sides of the passage of the disc. With this arrangement, the two elastic retainers offer equal resistance to the insertion of the disc, and the disc can be inserted in a transversely well-balanced state and without possibility of meandering.

BRIEF DESCRIPTION OF THE DRAWINGS

The invention will become more apparent upon a reading of the following detailed specification with reference to the accompanying drawings, in which:

FIG. 22 is a front view showing the relation between a slide and a double insertion prohibit member;

FIG. 23 is a front view showing the relation between the slide and the double insertion prohibit member;

FIG. 24 is a view for describing the timings of the start and stop of a one-direction motor;

DESCRIPTION OF THE PREFERRED EMBODIMENTS

Figure 1:
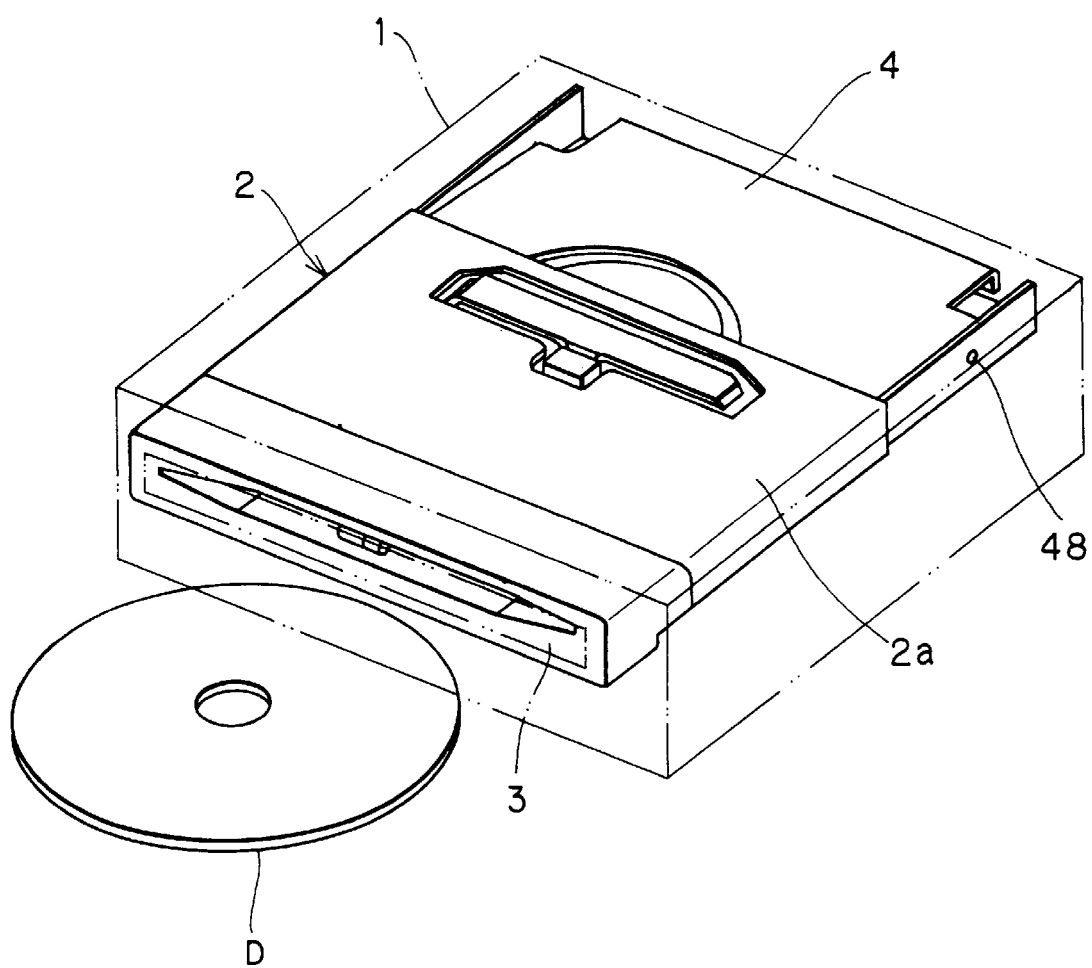
FIG. 1 is a perspective view showing an embodiment of the disc player according to the invention.

FIG. 1 is a perspective view showing a car-mounted disc player. The disc player has a cabinet 1, which accommodates a playing unit 2 mounted in it via a damper (not shown). The cabinet 1 has a disc insertion slot 3 formed in its front surface.

Figure 2:
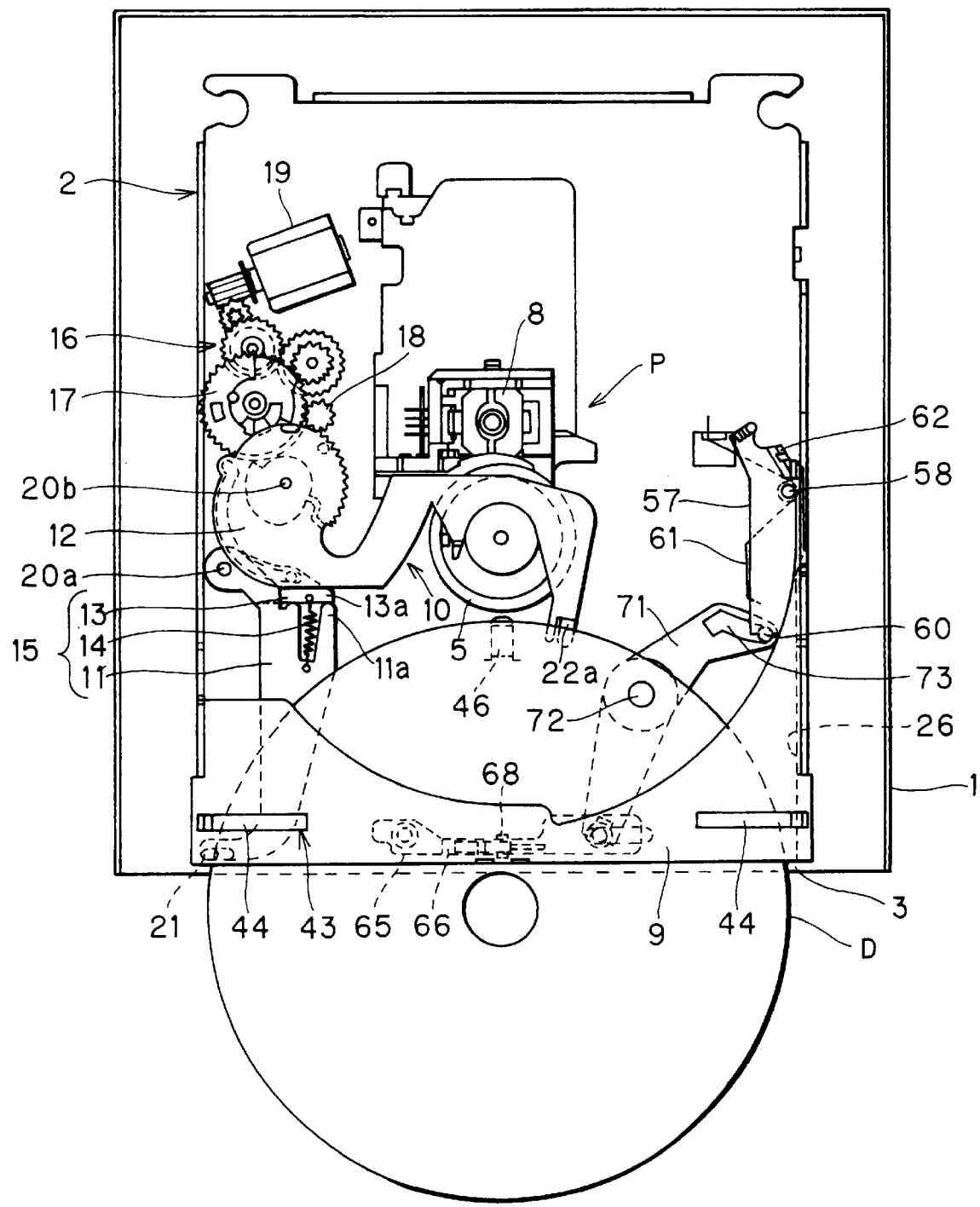
FIG. 2 is a plan view showing the internal construction of a playing unit in the disc player.
Figure 3:
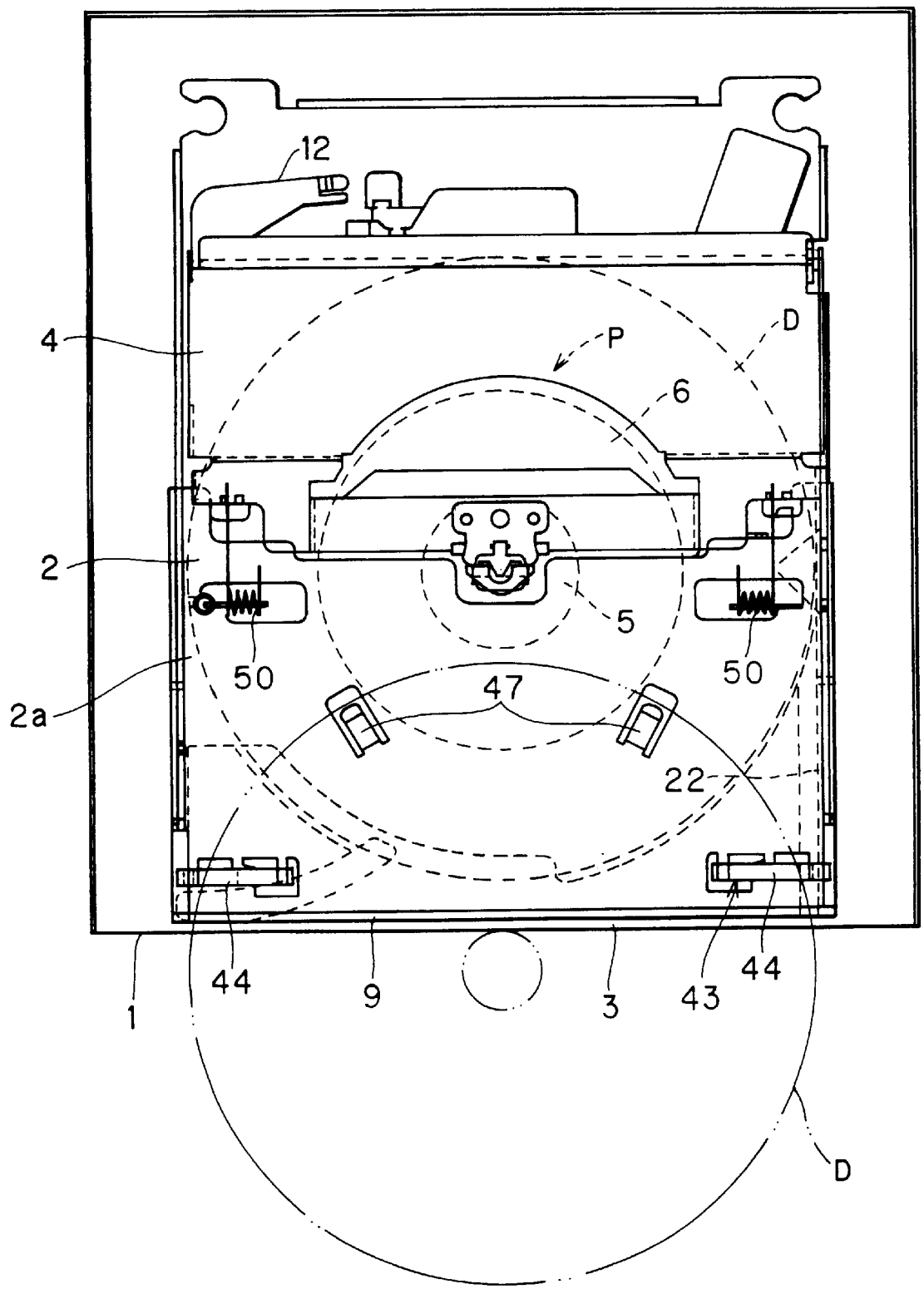
FIG. 3 is a plan view showing the playing unit.

FIG. 2 is a plan view showing the disc playing unit in an initial state thereof when a disc D is inserted from the disc insertion slot 3 or in a state when the disc D is pushed back from a playing portion P of the playing unit 2 toward the disc insertion slot 3. FIG. 3 is a plan view showing the disc playing in a state when the disc D is loaded in the playing portion P. As shown in FIGS. 1 and 3, the top of the playing unit 2 is covered by a ceiling plate 2a and a damper supporting member 4. In FIG. 2, the ceiling member 2a and the clamper supporting member are not shown.

Figure 4:
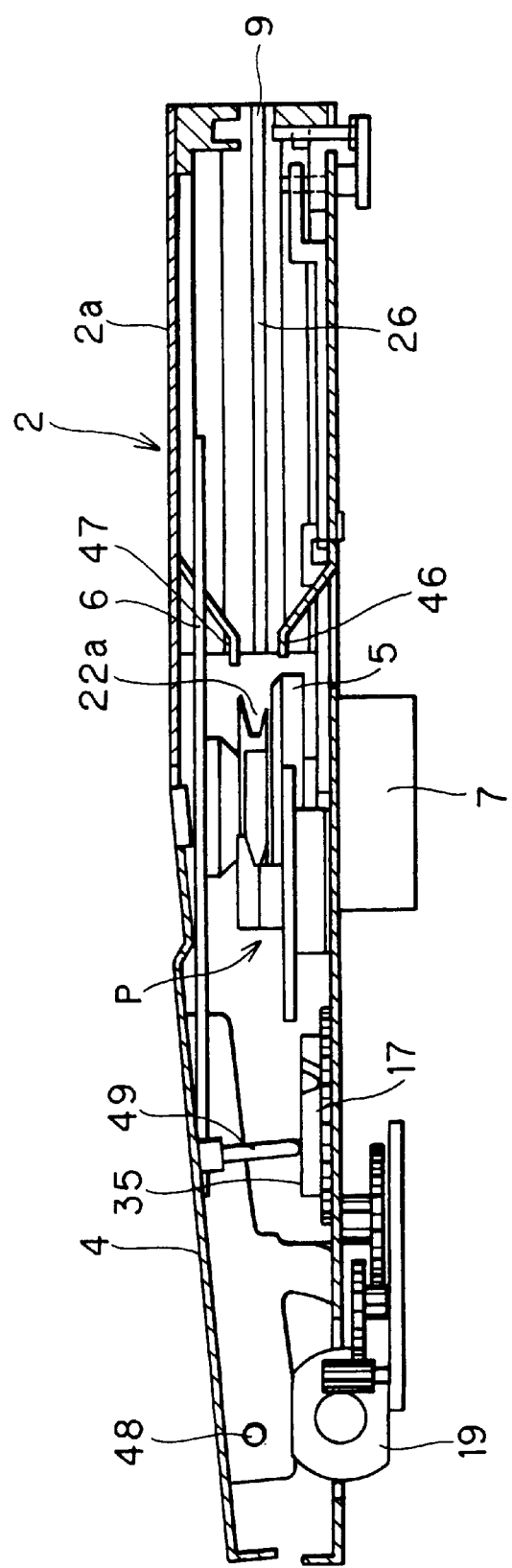
FIG. 4 is a left side view showing the internal construction of the playing unit.
Figure 5:
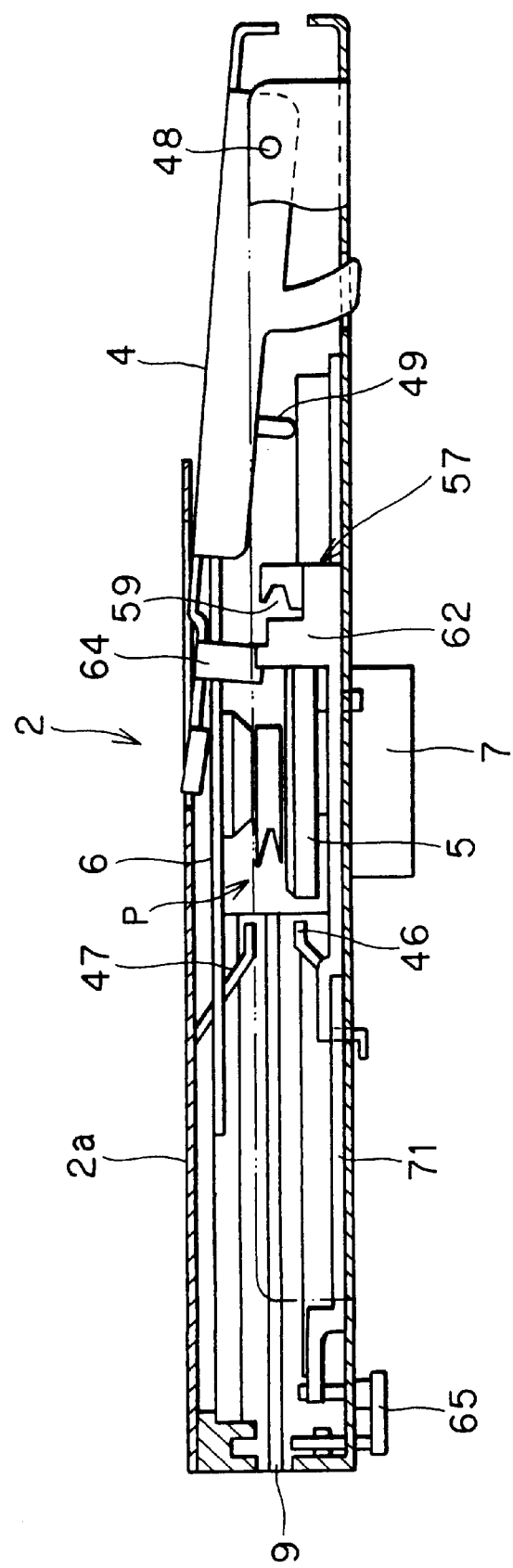
FIG. 5 is a right side view showing the same.

FIGS. 4 and 5 are a left side and a right side view, respectively, showing the internal construction of the playing unit 2. The playing portion P is disposed in a central part of the playing unit 2, and includes a turntable 5, a clamper 6, a motor 7 and a pick-up 8 (see FIG. 2). In the playing unit P, the disc D is held on the turntable 5 by the clamper 6, and the turntable 5, the clamper 6 and the disc D are driven to be rotated in unison with one another by a motor 7 for playing back data recorded in the disc D with the pick-up 8.

The playing portion P is disposed near the disc insertion slot 3 for playback with the disc D at a position, which is assumed when the entirety of the disc D is inserted slightly from the disc insertion slot 3 (see FIG. 3).

Figure 6:
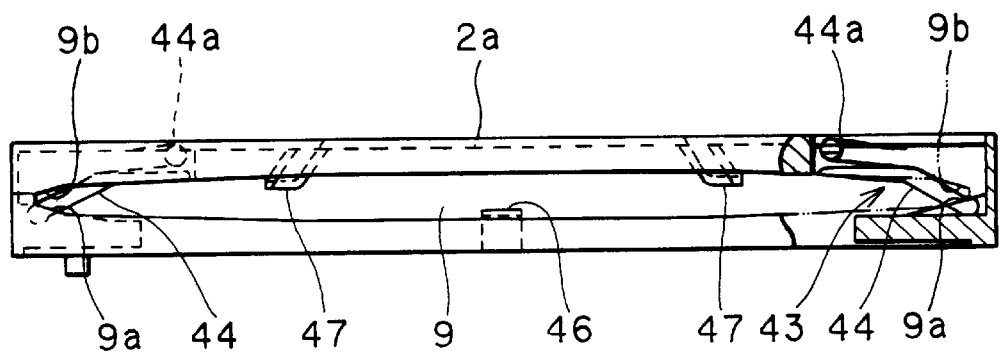
FIG. 6 is a front view, partly in section, showing the playing unit.
Figure 7:
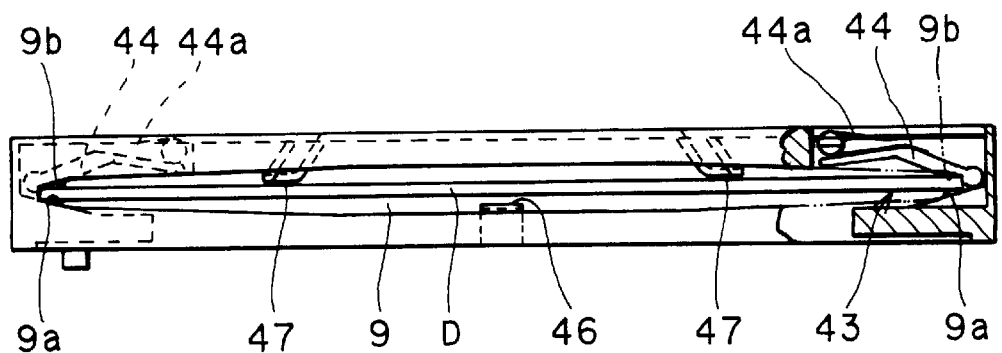
FIG. 7 is a front view showing the same with a disc loaded therein.

FIGS. 6 and 7 are front views, partly broken away, of the playing unit 2, which show a state that the disc D is not loaded and also show an initial state that the disc D is inserted, respectively. A passage 9 of disc D continuing from the disc insertion slot 3, is formed in a synthetic resin portion constituting a front end portion of the playing unit 2. The upper wall surface of the passage 9 has upward inclined surface portions 9a adjacent to and extending from the opposite edges of the passage 9. The lower wall surface of the passage 9, on the other hand, has downward inclined surface portions 9b in the like locality.

Figure 8:
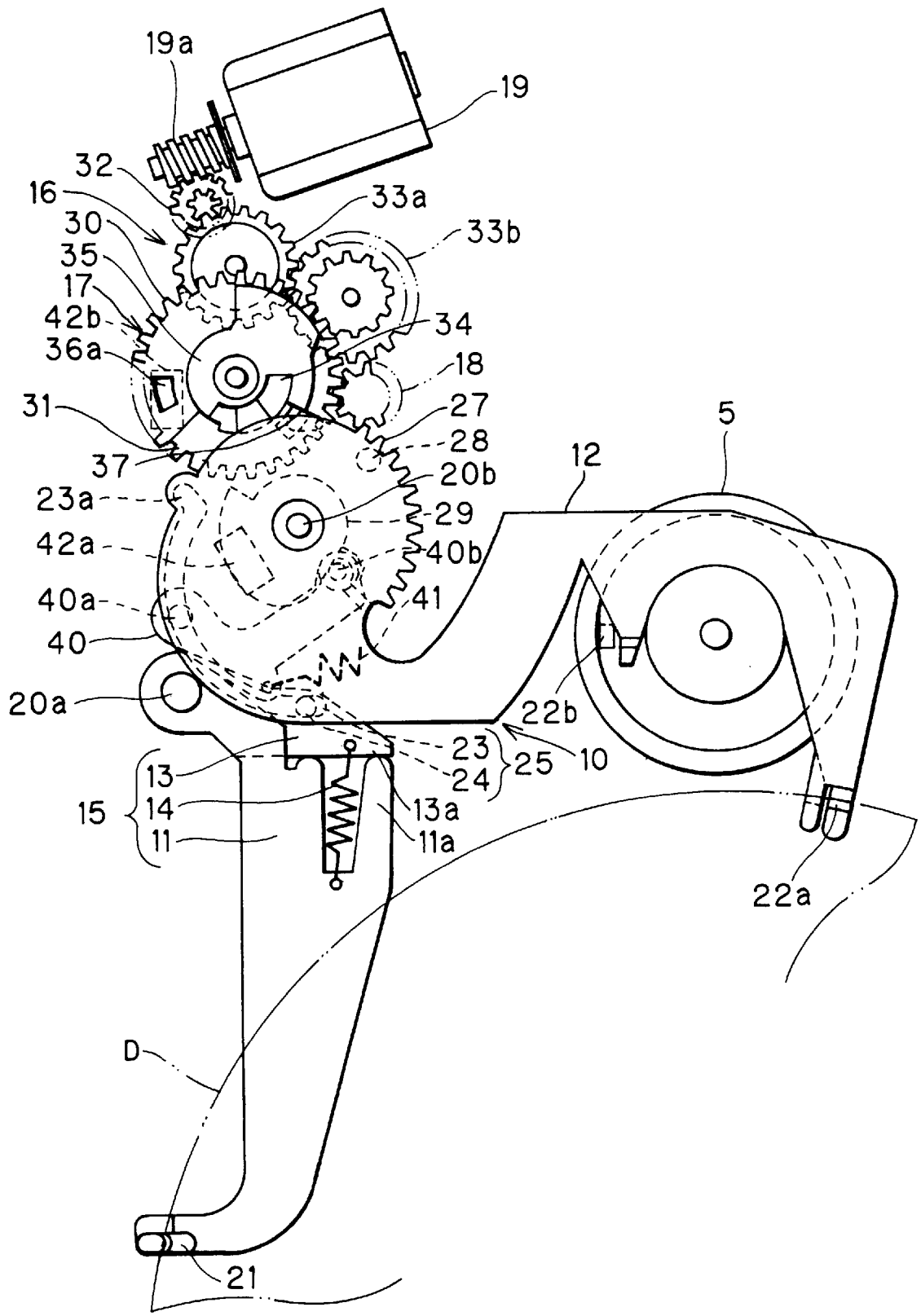
FIG. 8 is a plan view showing a transfer apparatus.

As shown in FIGS. 2 and 8, a transfer means 10 is disposed on one side of the passage 9 of the disc D (i.e., left side of the playing unit 2). The transfer means 10 includes a push-forth member 11 disposed near the disc insertion slot 3, a push-back member 12 disposed rearwardly thereto, and a connecting member 13 connecting the push-forth and push-back members 11 and 12 to each other. The push-forth member 11 and the connecting member 13 are elastically made integral by the spring 14 with their facing portions 11a and 13a in contact with each other. The facing portions 11a and 13a can be separated from each other against the force of the spring 14. The push-forth member 11, the connecting member 13 and the spring 14 together constitute a main push member 15.

A driving means 16 is disposed on the left side in the playing unit 2 and rearwardly of the push-back member 12. The driving means 16 includes a rotation member 17, an idler gear 18 and a one-direction motor 19 as a drive source, and can reciprocally drive the push-back member 12.

The push-forth member 11 and the connecting member 13 are rockably mounted on a common shaft 20a, and the push-back member 12 is rockably mounted on another shaft 20b.

Figure 9:
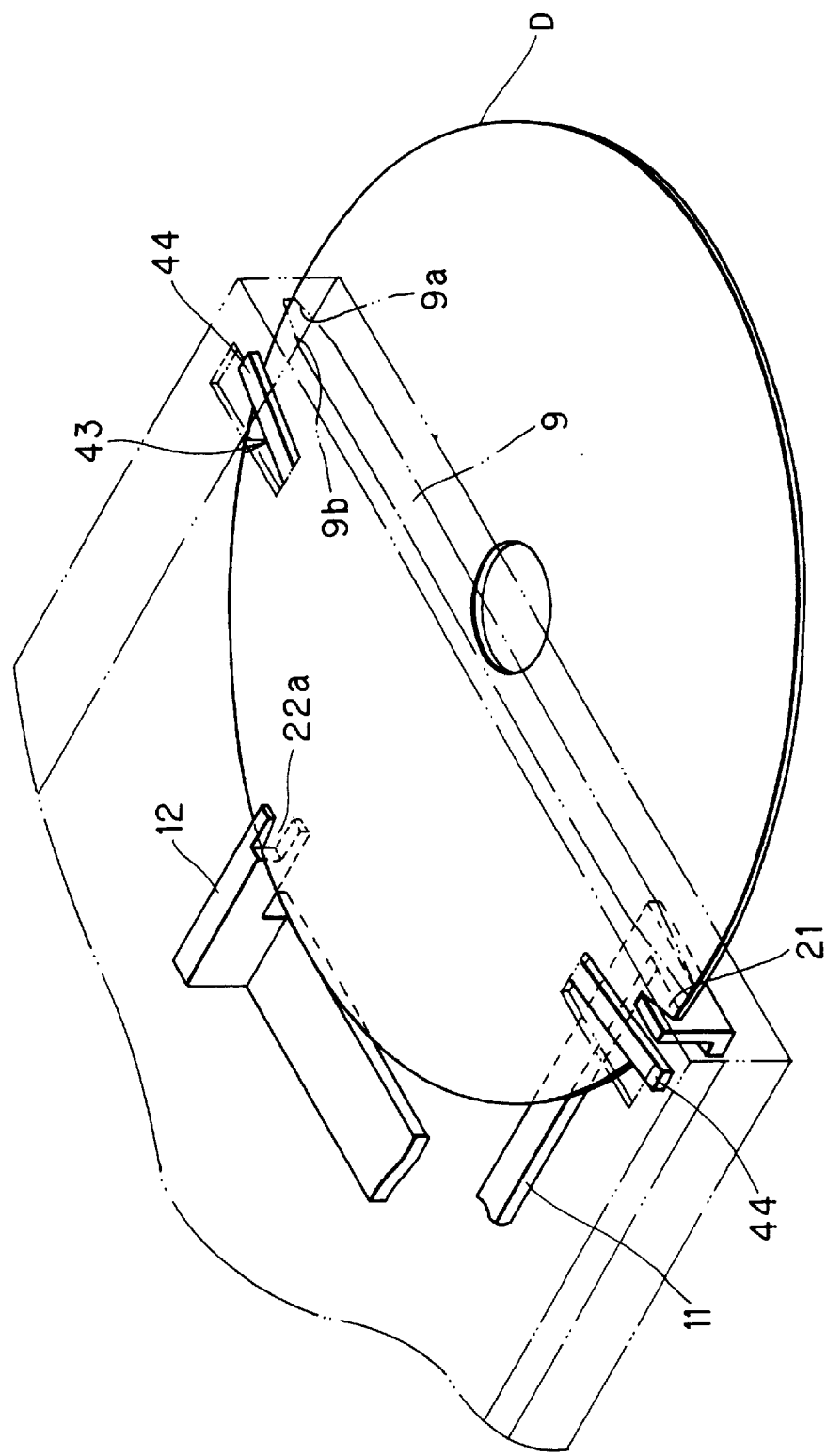
FIG. 9 is a view for describing the shapes of end portions of a push-forth and a push-back member and an elastic holding mechanism.
Figure 10:
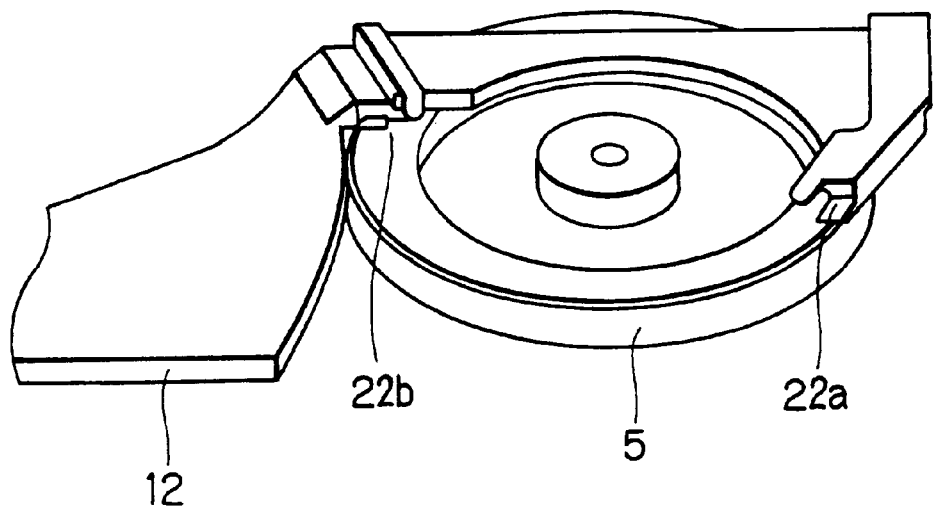
FIG. 10 is a perspective view showing the relation between the push-back member and a turntable.

As shown in FIG. 9, rockable ends of the push-forth and push-back members 11 and 12 have a disc push portion 21, in a V-shaped form when viewed sidewise, and a first disc receiving portion 22a, respectively. As shown in FIG. 8, the push-back member 12 has another disc receiving portion, i.e., a second disc receiving portion 22b, also having a V-shaped form, between the center of its rocking and the first disc receiving member 11 is at a receiving position to receive the insertion of the disc, the disc push portion 21 is at a position near the left end of the disc insertion slot 3, the push-back member 12 is at a waiting position for being in contact with the edge of the disc D inserted from the disc insertion slot 3, and the first and second disc receiving portions 22a and 22b are located above the turntable 5 (FIGS. 8 and 10).

Figure 11:
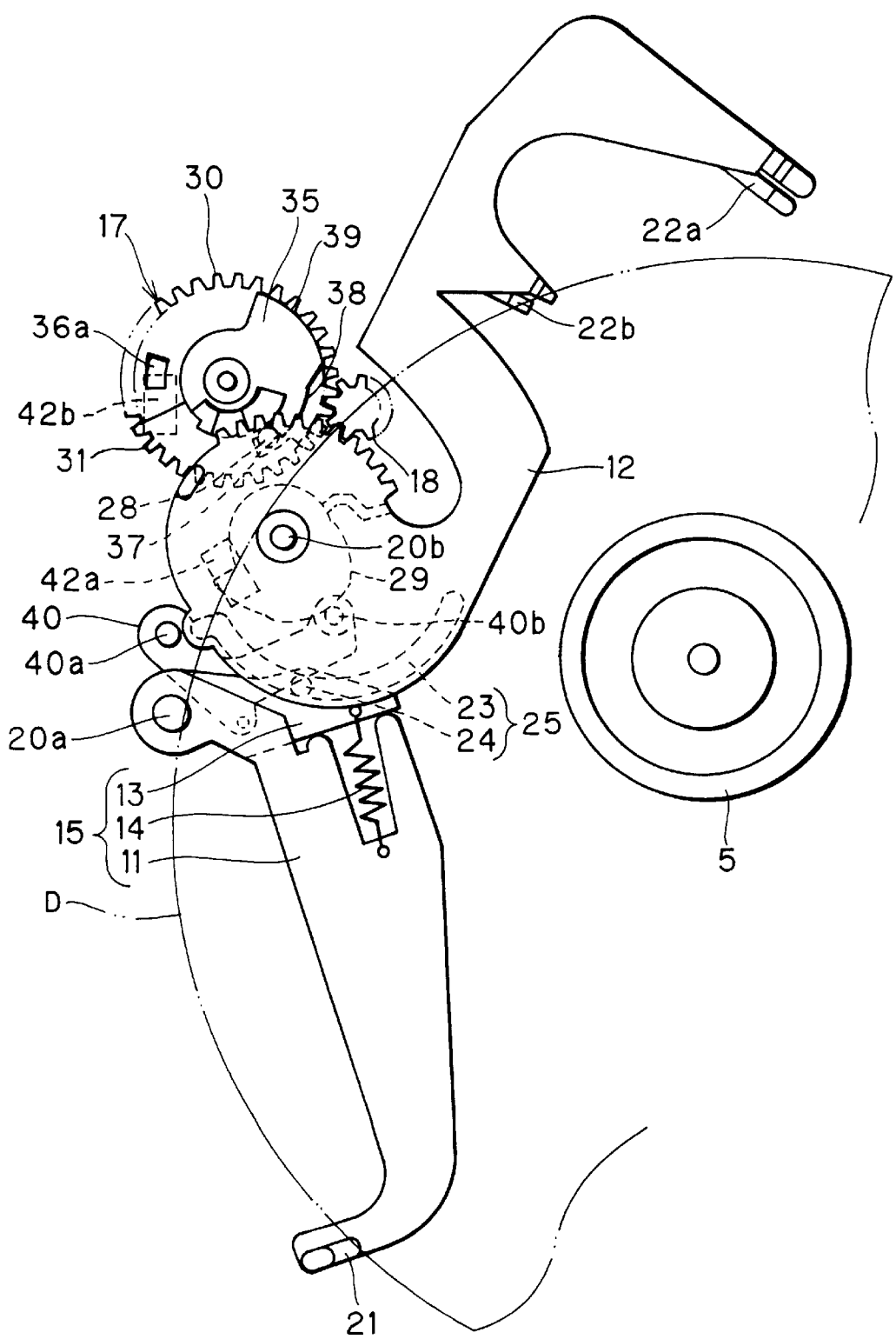
FIG. 11 is a plan view showing the transfer apparatus.
Figure 12:
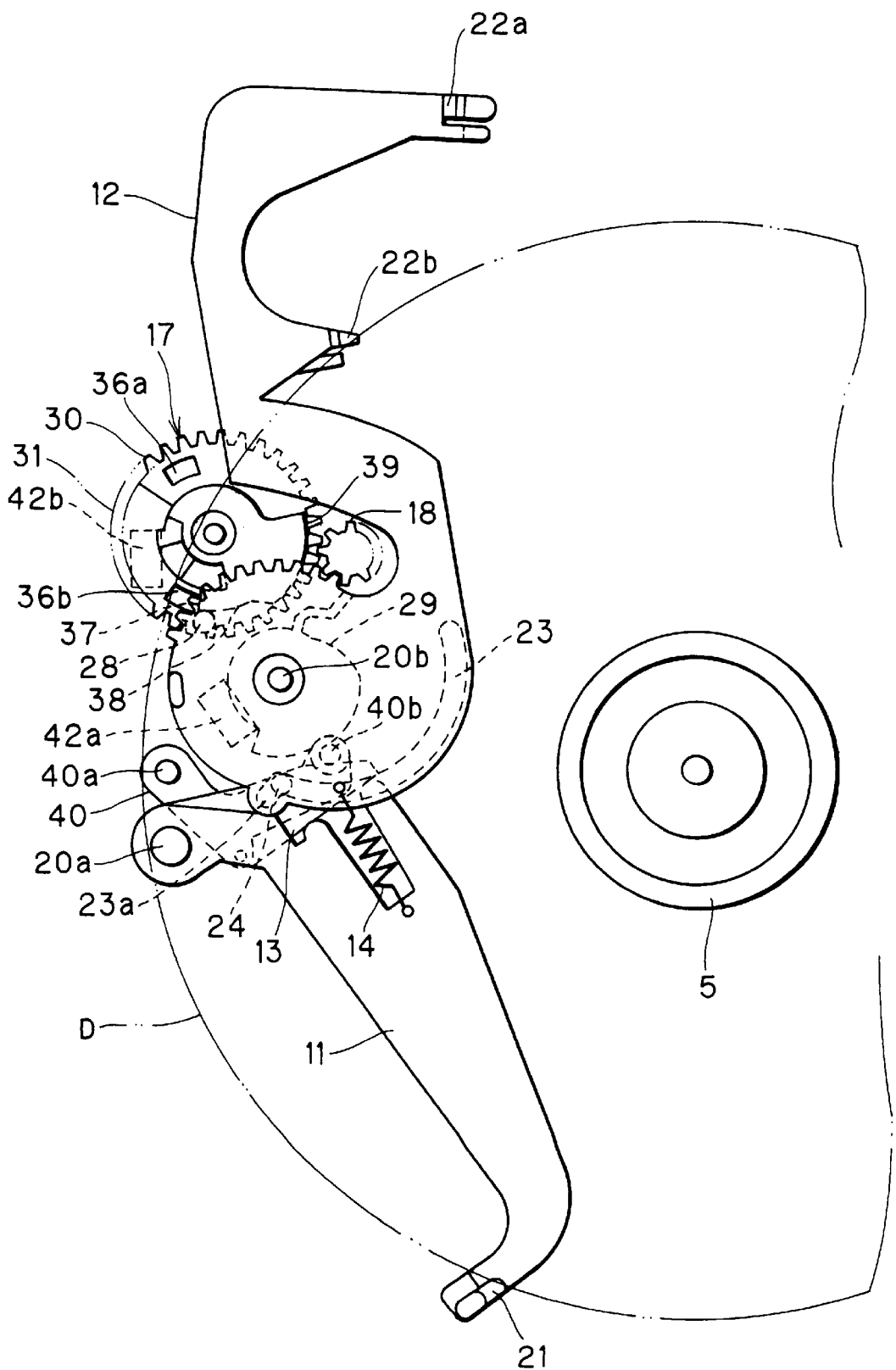
FIG. 12 is a view similar to FIG. 11 but showing the transfer apparatus in a different state.
Figure 13:
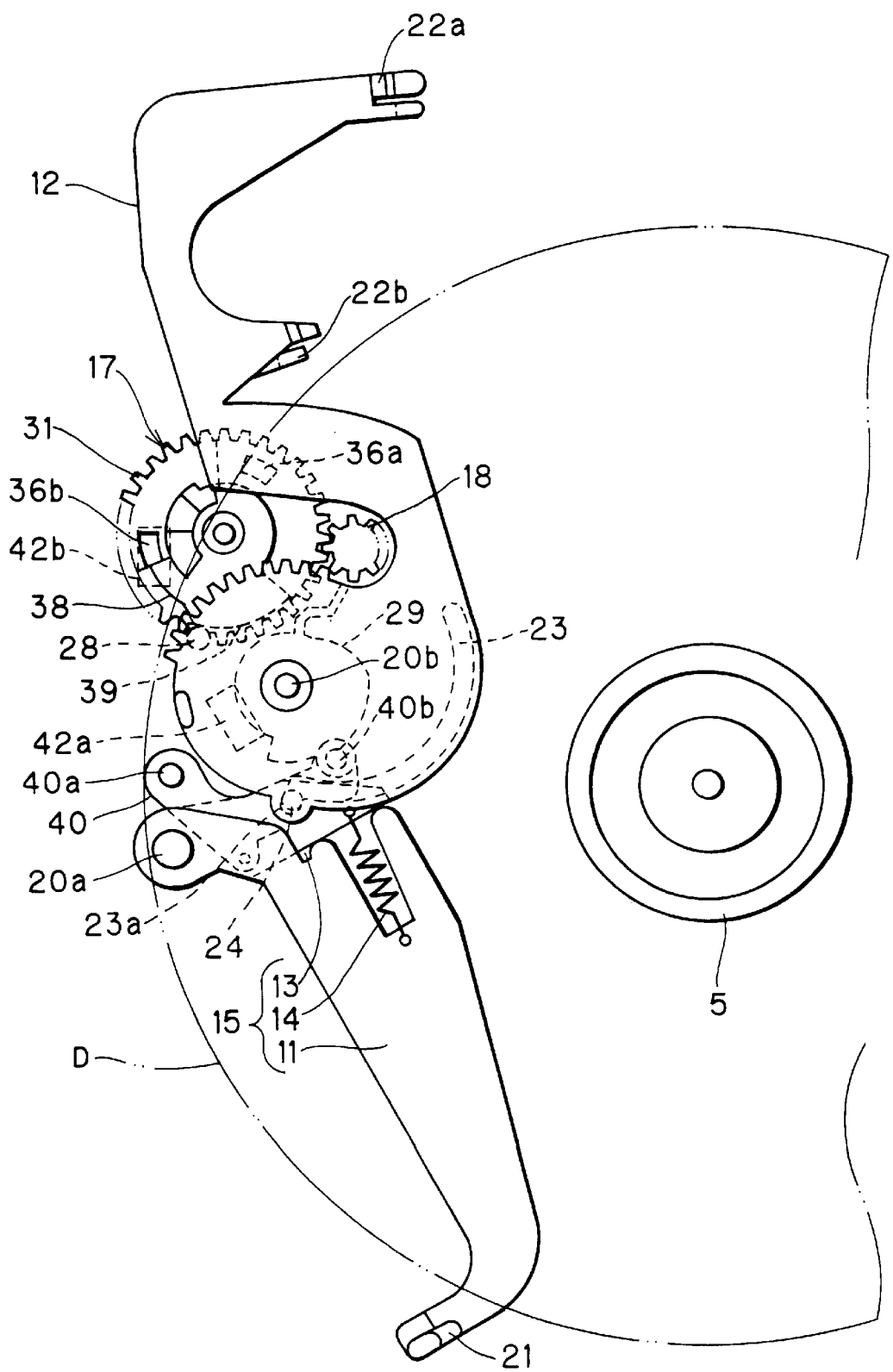
FIG. 13 is a view similar to FIG. 11 but showing the transfer apparatus in a further state.

As shown in FIG. 8, the push-back member 12 has a cam groove 23 formed spirally around the center of its rocking. The connecting member 13 has a cam pin 24, which is received in the cam groove 23, the cam groove 23 and the cam pin 24 thus constituting a cam mechanism 25. The cam groove 23 has an inclined groove portion formed as a separating portion 23a adjacent its end closer to the center of rocking. When the disc D is not inserted, the cam pin 24 is at its position as shown in FIG. 8, near the end of the cam groove 23 closer to the center of rocking of the push-back member 12. When the disc D is inserted to cause rocking of the push-back member 12 rearwardly of the playing unit 2, the cam pin 24 is moved along the cam groove 23 toward the other end thereof, as shown in FIGS. 11 and 12, thereby causing the connecting member 13 to follow the push-back member 12 and rock. When the cam pin 24 is moved to the separating portion 23a, as shown in FIG. 13, the connecting member 13 is slightly pushed back. When the connecting member 13 rocks about the shaft 20a, the push-forth member 11 also rocks about the shaft 20a in unison with the connecting member 13.

Reference numeral 26 in FIG. 2 designates a disc guide, which is formed such that it is integral with a synthetic resin portion constituting a front end portion of the playing unit 2. An orbit of transfer of the disc D is set with the edge thereof in contact with the disc guide 26.

As shown in FIG. 8, the push-back member 12 has a gear portion 27, a contact portion 28 and a spiral pressure receiving portion 29, these portions being formed around the center of its rocking.

Figure 14:
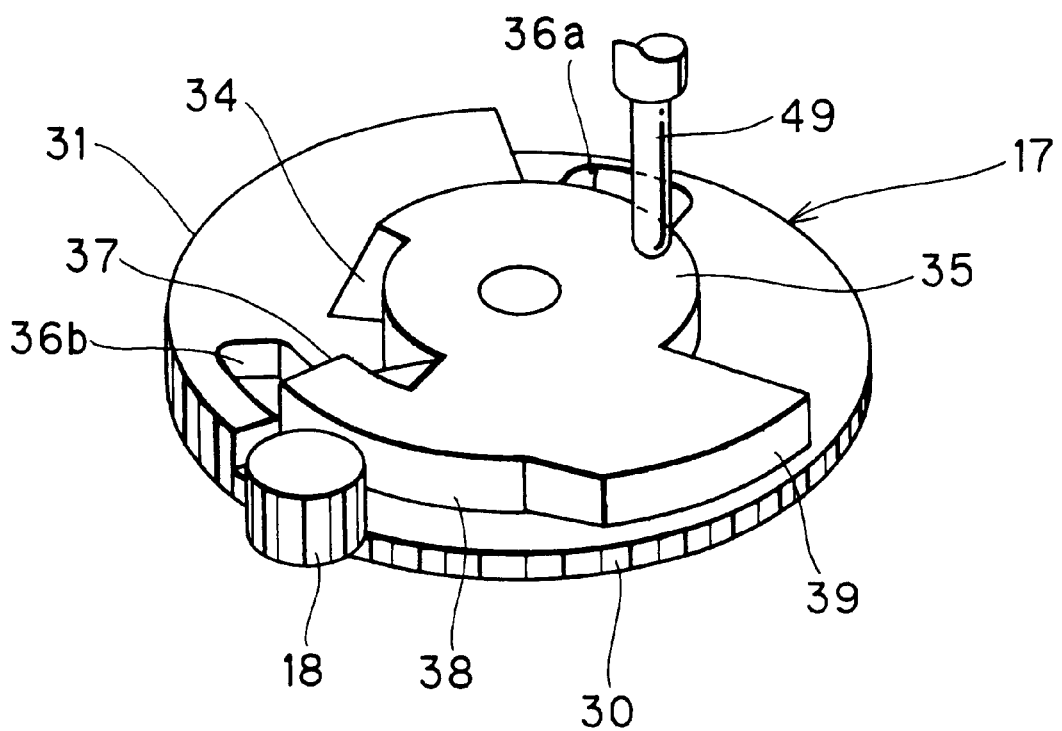
FIG. 14 is a perspective view showing the relation between a rotation member and an idler gear.

As shown in FIG. 14, the rotation member 17 has a spur gear 30 formed in its lower portion and a partial gear 31 formed in its upper or remaining portion and having teeth formed only in an angular range of about 100 degrees. The torque of the motor 19 is transmitted via a worm gear 19a mounted on the motor shaft, a worn wheel 32 and a first and a second speed reduction gear 33a and 33b to the spur gear 30. The partial gear 31 can be selectively meshed with the idler gear 18, which in turn is always in mesh with the gear portion 27 of the push-back member 12. The worm wheel 32 and the first and second speed reduction gears 33a and 33b constitute the driving means 16 together with the rotation member 17 and the idler gear 18.

As also shown in FIG. 14, from the top surface of the rotation member 17 is projected a push member 35, which has a clamper control cam 34 formed by recessing a portion of its top surface. The rotation member 17 also has a first and a second angular hole 36a and 36b which is formed to penetrate the rotation member 17. The push member 35 has a push portion 37 coincident with the radial direction of the rotation member 17 and also a first and a second arcuate surface 38 and 39 continuous in succession from the push portion 37. When the disc D is not inserted, the contact portion 28 of the push-back member 12 is out of the orbit of rocking of the push portion 37, but when the push-back member 12 is pushed by the disc D and caused to rock, it is brought to the orbit of rocking of the push portion 37, as shown in FIG. 11.

With clockwise rotation of the rotation member 17 caused in this state, the push portion 37 pushes the contact portion 28 of the push-back member 12 and causes rocking thereof rearwardly of the playing unit 2, i.e., in the counterclockwise direction. As the rotation of the rotation member 17 proceeds, the push portion 37 is eventually separated from the contact portion 28, and subsequently the first arcuate surface 38 is brought into contact with the contact portion 28, as shown in FIG. 12. During this time, the push-back member 12 is held at a fixed position. As the rotation of the rotation member 17 further proceeds, the second arcuate surface 39 replaces the first arcuate surface 38 and is brought into contact with the contact portion 28. At this time, the push-back member 12 is again pushed rearwardly. While the second arcuate surface 39 is in contact with the contact portion 28, the push-back member 12 is held at a fixed position.

As shown in FIG. 8, a push member 40 is rockably mounted by a shaft 40a to the underside of the push-back member 12. The push member 40 has a push pin 40b provided at its rockable end, and it is always pushed by a spring 41 against the outer periphery of the pressure receiving portion 29 of the push-back member 12.

As shown in FIGS. 15A to 15E, the pressure receiving portion 29 has a locking portion 29a for being in contact with the push pin 40b and thus locking the push-back member 12 at the end position of clockwise rocking, a first pressure receiving surface 29b progressively more distant from the center of rocking in the clockwise direction from the locking portion 29a, a second pressure receiving surface 29c for being progressively closer to the center of rocking from the first pressure receiving surface 29b, and an arcuate surface 29e spaced apart from the second pressure receiving surface 29c by a step 29d.

Figure 15A:
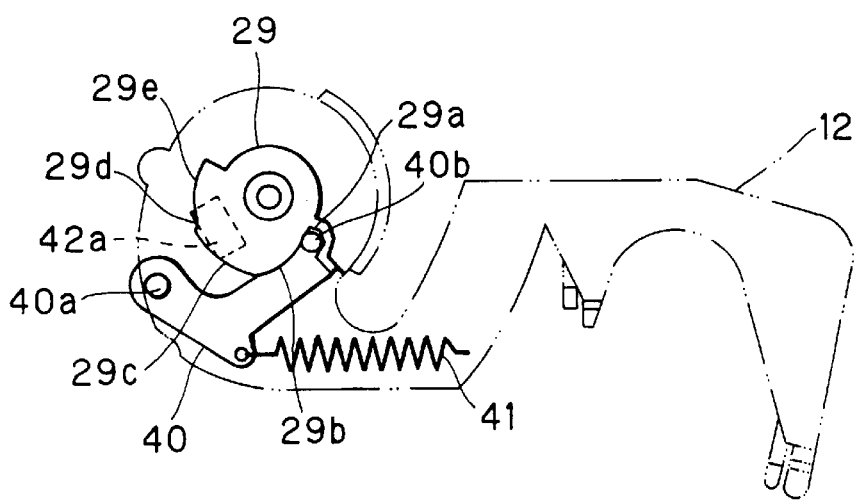
FIGS. 15A, 15B, 15C, 15D, and 15E are plan views showing the relation between the push-back member and a holding member.

When the push pin 40b is held pushed against the first pressure receiving surface 29b, its pushing force acts to cause clockwise rocking of the push-back member 12. Before the disc insertion, as shown in FIG. 15A, the locking portion 29a is in contact with the push pin 40b and thus prohibiting clockwise rocking of the push-back member 12, and the push-back member 12 is held at its initial position by the pushing force of the push pin 40b received by the locking portion 29a.

Figure 15B:
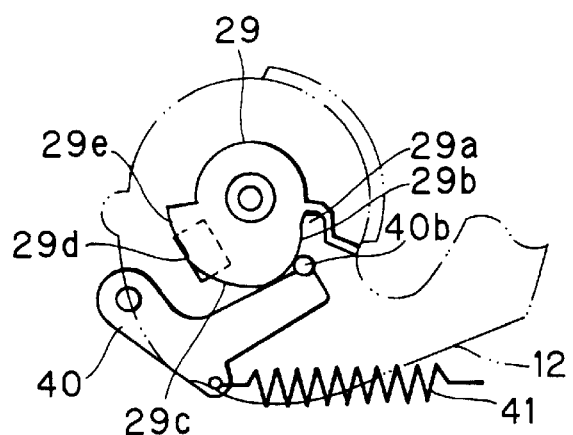

When the disc D is inserted form the disc insertion slot 3, the push-back member 12 is pushed by the disc D and, as shown in FIG. 15B, rocks in the counterclockwise direction while pushing back the push pin 40b with the first pressure receiving surface 29b.

Figure 15C:
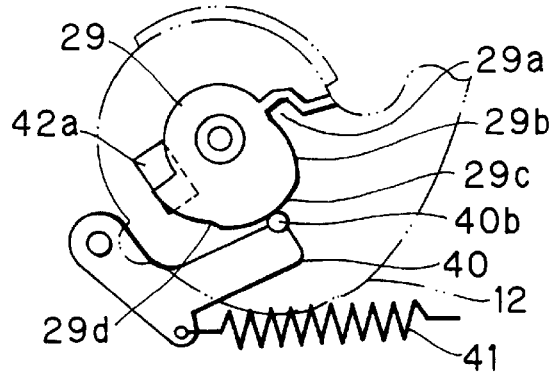

When the second pressure receiving surface 29c replaces and is brought into contact with the push pin 40b, as shown in FIG. 15C, the pushing force of the push pin 40b exerted to the second pressure receiving surface 29c acts to cause counterclockwise rocking of the push-back member 12.

Figure 15D:
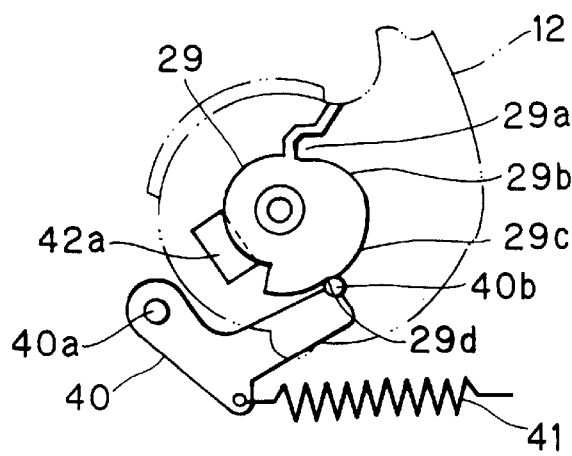
Figure 15E:
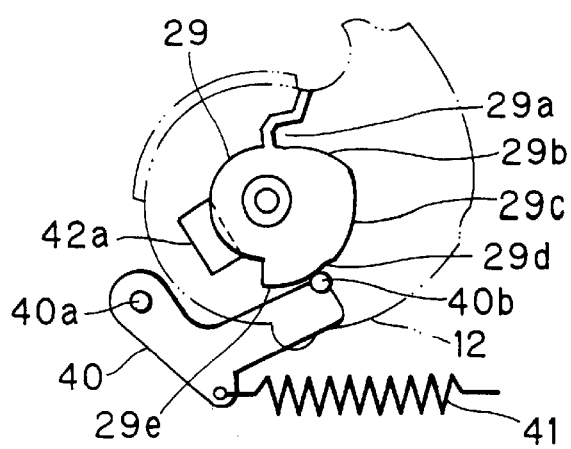

When the push pin 40b is brought from the second pressure receiving surface 29c via the step 29d as shown in FIG. 15D to the arcuate surface 29e, as shown in FIG. 15E, the pushing force of the push pin 40b exerts no rocking force to the push-back member 12 in either direction.

Figure 16:
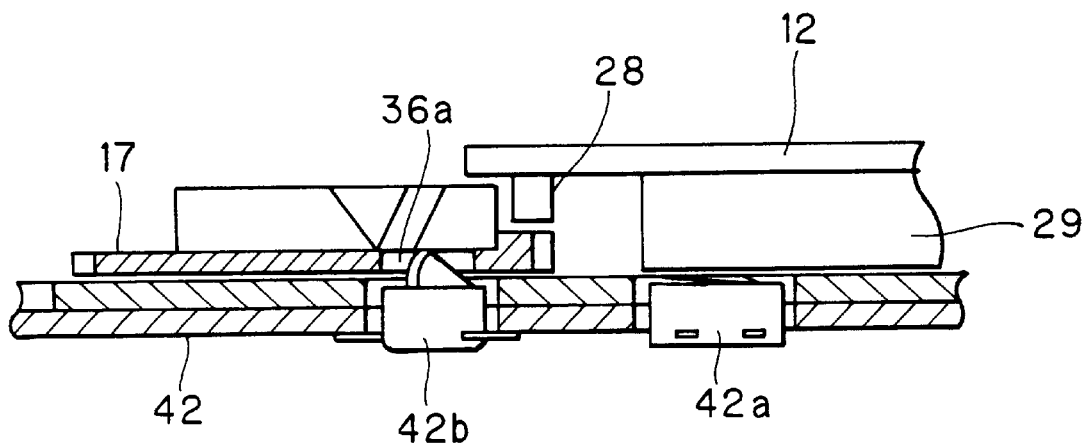
FIG. 16 is a side view showing the relationship among the rotation member, the push-back member and a switch.

As shown in FIG. 16, a first switch 42a is disposed below the push-back member 12, and a second switch 42b is disposed below the rotation member 17. In FIG. 16, reference numeral 42 designate a printed circuit board. Although not shown, an ejection switch is further provided, which is operated by the disc unloading operation. These switches are provided for controlling the one-direction motor 19. The first switch 42a is turned on when it is pushed by the pressure receiving portion 29 of the push-back member 12. The second switch 42b is held "off" when it is in the first or second angular hole 36a or 36b, and is turned on when it is detached from the angular hole 36a and 36b and pushed by the bottom surface of the rotation member 17.

Figure 17:
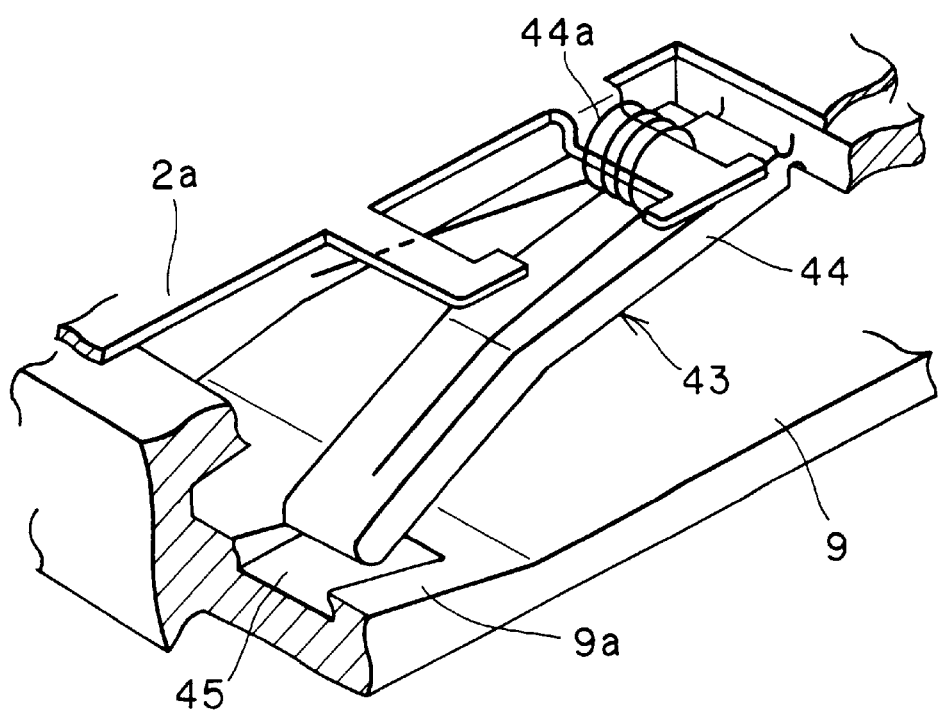
FIG. 17 is a fragmentary perspective view showing an elastic holding mechanism.

As shown in FIGS. 2, 3, 6 and 7, an elastic holding mechanism 43 is provided in the front end portion of the playing unit 2. The elastic holding mechanism 43 is constituted by a pair of elastic retainers 44 disposed symmetrically above and on the opposite sides of the passage 9, auxiliary springs 44a (see FIG. 17) for downwardly biasing the retainers 44, and the inclined surfaces 9a of the bottom wall surface of the passage 9. The pair elastic retainers 44 are formed to be integral with a synthetic resin portion as a front end portion of the playing unit 2. As shown in FIG. 17, each inclined surface 9a has a recess 45 (only left side one being shown) formed at a position corresponding to the free end of each elastic retainer 44 to increase the flexing extent thereof.

The pair elastic retainers 44 are held within the passage 9 of the disc D with their lower surfaces inclined relative to the plane of the disc D. When the disc D is inserted from the disc insertion slot 3, the elastic retainers 44 have their lower surfaces raised by the edge of the disc D, thus permitting the disc D to enter the space between them and the inclined surface portions 9a. When the disc D reaches a playing position, as shown in FIG. 3, it is spaced apart form the elastic retainers 44 and the inclined surfaces 9a.

As shown in FIG. 2, the elastic holding mechanism 43 serves to elastically hold a portion of the disc D on the outer side of the recording area lest the disc D so that the disc D does not get out from the disc insertion slot 3 to the outside when the disc D is pushed back by the transfer means 10 from the playing portion P toward the disc insertion slot 3.

In order that the disc D can be readily taken out with a hand, the extent of push-back of the disc D by the push-back member 12 is desirably set to be as great as possible. When the disc D is pushed back by the push-back member 12 to a position, at which the center hole of the disc D at least partly projects from the disc insertion hole 3, the disc D can be readily taken out by holding its portion on the inner side of the recording area from both the upper and lower sides with fingers. As shown in FIG. 2, with an arrangement that the disc D is pushed back up to a position, at which the center hole of the disc D fully projects from the disc insertion slot 3, the disc D can be readily taken out by inserting fingers into the center hole.

Figure 18:
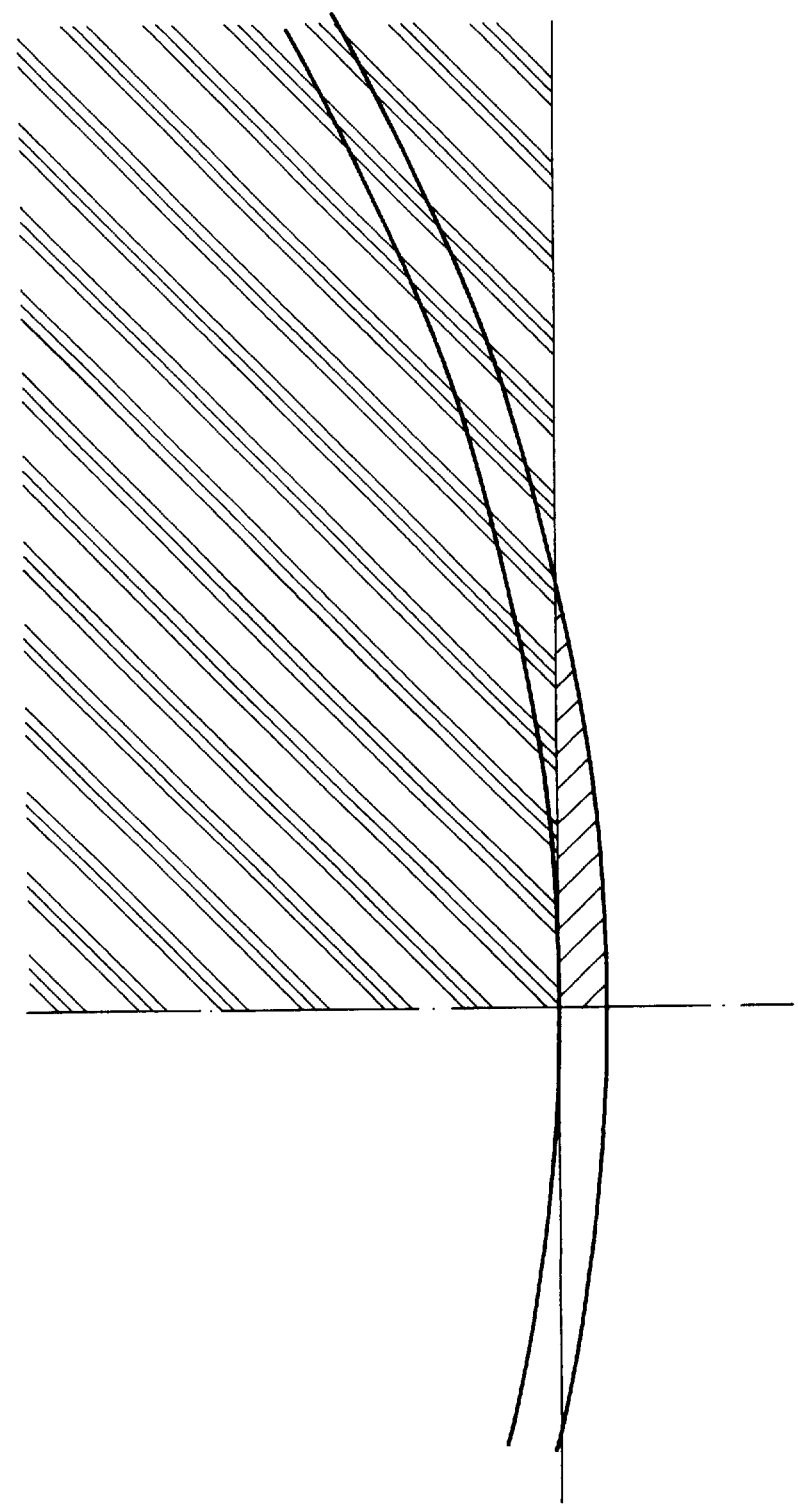
FIG. 18 is a view for describing the range of disc, in which the disc can be held by the elastic holding mechanism.

The disposing position of the elastic holding mechanism 43 is restricted. That is, the elastic holding mechanism 43 should be disposed at a position that the disc D can be held at the position thereof reached when pushed back by the transfer means 10, while being out of contact with the disc during playback and also out of contact with the recording area of the disc during the disc transfer. Referring to FIG. 18, shown coarsely shaded is passage of the recording area of the disc D, and the range of the disc that can be held is on the outside of the coarsely shaded area as finely shaded. Thus, with the elastic retainers 44 formed such that their lower surfaces are inclined relative to the plane of the disc D for holding the edge of the disc D pushed back by the transfer means, the scope be increased, thus increasing the degree of freedom of design.

As shown in FIG. 2 to FIG. 7, a lower guide piece 46 is provided on the lower wall surface of the passage 9 of the disc D, and a left and a right upper guide pieces 47 are provided on the ceiling plate 2a between the disc insertion slot 3 and the turntable 5. The disc D inserted form the disc insertion slot 3 is thus led through the space between the lower guide piece 46 and the upper guide piece 47 to the space between the turntable 5 and the clamper 6.

As shown in FIGS. 4 and 5, the damper supporting member 4 is mounted by a horizontal shaft 48 in the rearmost portion of the playing unit 2. The damper 6 can be moved vertically by causing vertical rocking of the clamper supporting member 4. The clamper supporting member 4 has a cam contact portion 49 depending from its lower surface. As shown in FIG. 3, the cam contact portion 49 is always biased by a pair of springs 50 to be in contact with the top surface of the rotation member 17.

When the cam contact portion 49 is brought into contact with the clamper control cam 34 with rotation of the rotation member 17, the damper supporting member 4 is caused to rock downward. As a result, the damper 6 is lowered and comes to hold the disc D on the turntable 5. In this state, the turntable 5 can be rotated for playing back data with the pick-up 8.

Figure 19:
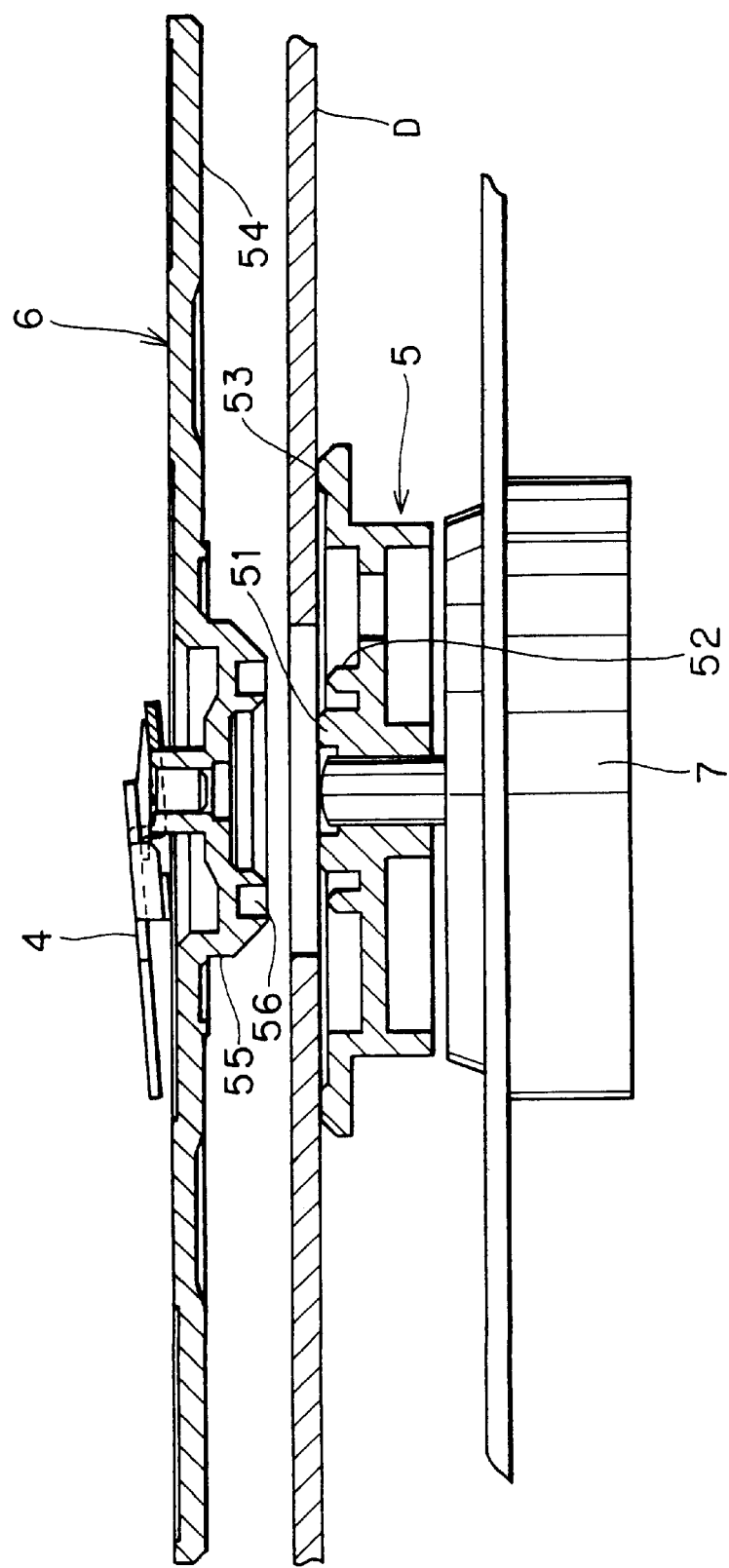
FIG. 19 is a sectional view showing the relation between the turntable and a clamper.

As shown in FIG. 19, the turntable 5 has a center boss 51 having a center hole, in which the shaft of the motor 7 is fitted, an annular projection 52 formed around the boss 51, and a disc holding surface 53 formed on the outer periphery of the top surface. The boss 51 and the annular projection 52 do not project upward from the disc holding surface 53. Thus, the disc D can be transferred from the disc insertion slot 3 to the playing portion without being obstructed by the boss 51 or annular projection 52. That is, the disc D can be transferred horizontally at a level very close to the disc holding surface 53. After the disc D has been transferred to its set position on the turntable 5, it can be held on the disc supporting surface 53 by merely lowering the damper 6.

The clamper 6 has a flange portion 54 for pushing the disc D on the disc holding surface 53 and an annular projection 55 for being fitted on the boss 51. The annular projection 55 has a circular small recess 56, in which the annular projection 52 is to be fitted. The turntable 5 and the clamper 6 are centered to each other by the engagement between the outer periphery of the boss 51 and the inner periphery of the annular projection 55. In addition, the turntable 5, the clamper 6 and the disc D are centered to one another by fitting the annular projection 55 in the center hole of the disc D.

Figure 20:
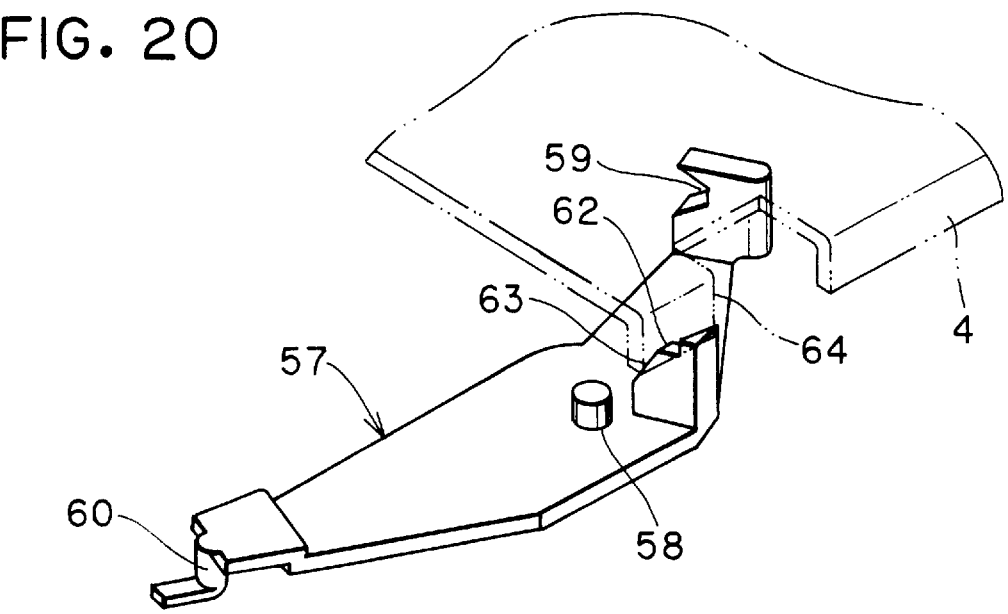
FIG. 20 is a perspective view showing a stopper.

As shown in FIG. 2, in a right side part of the playing unit 2 a stopper 57 is mounted on a shaft 58 for horizontal rocking thereabout. As shown in FIG. 20, the stopper 57 has a disc receiving portion 59 provided at one end, having a V-shaped form, and also an engagement pin 60 provided at the other end, and it is biased for rocking in the counterclockwise direction by a torsion spring 61. The stopper 57 has an upwardly projecting preventing portion 62 formed between the disc receiving portion 59 and the center of rocking. The preventing portion 62 terminates in a downwardly inclined surface, which serves as a sliding contact portion 63.

Figure 21A:
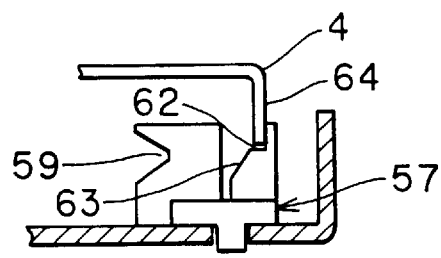
FIGS. 21A, 21B and 21C are elevational views showing the relation between the stopper and a clamper supporting member.
Figure 21B:
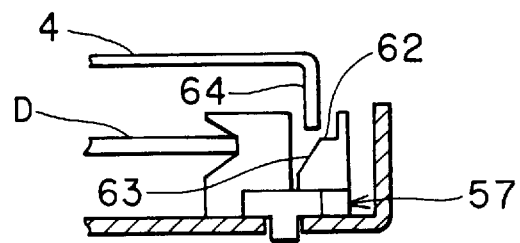
Figure 21C:
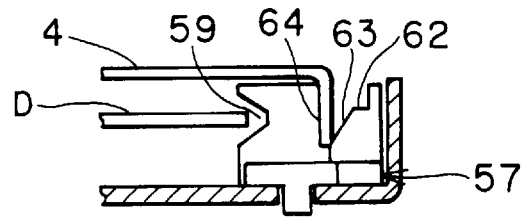

As shown in FIG. 5, the clamper supporting member 4 has a downwardly extending engagement portion 64 provided on one side. The engagement portion 64 is movable along a line of movement as the clamper supporting member 4 rocks. The stopper 57 is located beneath the engagement portion 64 so as to be selectively positioned on the line of movement of the engagement portion 64. The stopper 57 is normally at a position as shown in FIG. 2. In this state, the preventing portion 62 is located under the engagement portion 64 as shown in FIG. 21A and prohibiting downward rocking of the damper supporting member 4. When the disc D is inserted and reaches the position to be held on the turntable 5, the disc receiving portion 59 is pushed by the edge of the disc D, thus causing rocking of the stopper 57 to an approach allowable position. As shown in FIG. 21B, the preventing portion 62 is caused to depart from its position under the engagement portion 64, and the sliding contact portion 63 replaces the preventing portion 62 and is brought to the position under the engagement portion 64, so that the clamper supporting member 4 becomes ready to rock downward. When the clamper supporting member 4 rocks downward, the engagement portion 64 is brought into contact with the sliding contact portion 63 and causes further clockwise rocking of the stopper 57, thus bringing the disc receiving portion 59 to a retreated position spaced apart from the edge of the disc D, as shown in FIG. 21C.

As shown in FIGS. 2 and 22, in the playing unit 2 at a position thereof near the disc insertion slot 3, a slide 65 is mounted for movement in transversal directions. The slide 65 has a rack 66 provided at the top surface, and is always pulled by a spring 67 toward a rightward direction. A double insertion prohibit member 68 is mounted through a shaft 69 between the slide 65 and the disc insertion slot 3. The member 68 had a gear portion 70 in mesh with the rack 66.

The double insertion prohibit member 68 is normally at a position spaced apart from the passage 9 of the disc D. When the slide 65 is moved to the right, the member 68 is caused to rock by substantially 90 degrees to an upright state at a front position of the passage 9 of the disc D, as shown in FIG. 23, and thus prohibits insertion of the disc D from the disc insertion slot 3. As shown in FIG. 2, the stopper 57 and the slide 65 are coupled to each other via an intermediate member 71. The intermediate member 71 is capable of rocking horizontally about a shaft 72, and has an end portion having an elongate hole 73, in which the engagement pin 60 of the stopper 57 is received, and has the other end rockably coupled to the slide 65. The engagement pin 60 is held at the right end of the elongate slot 73 by the elastic force of the spring 67.

In the disc player having the construction as described above, the disc D is transferred as follows.

Before the disc insertion, the push member 40 is holding the push-back member 12 at the position as shown in FIG. 8, with its first and second disc receiving portions 22a and 22b found above the turntable 5. In this state, the cam pin 24 of the connecting member 13 is located in the cam groove 23 in the end portion thereof remote form the center of rocking, and is holding the disc push portion 21 of the push-forth member 11 at the left end of the disc insertion slot 3. Also, as shown in FIG. 15A, the first switch 42a is held pushed and "on" by the pressure receiving portion 29 of the push-back member 12, and the second switch 42b is found in the first angular hole 36a of the rotation member 17 and "off". Furthermore, the one-direction motor 19 is held stationary.

In this state, the edge of disc D inserted from the disc insertion slot 3 passes by the disc pushing portion 21 of the push-forth member 11 and, as shown in FIG. 7, comes to intervene between the elastic retainers 44 and the inclined surface portions 9a.

As shown in FIG. 2, after the edge tip of the disc D has been brought into contact with the first disc receiving portion 22a of the push-back member 12, the disc D pushes forth the push-back member 12 (toward the rear of the playing unit 2).

At this time, the push-back member 12 rocks to cause movement of the cam pin 24 of the connecting member 13 along the cam groove 23. The connecting member 13 and the push-forth member 11 thus follow the push-back member 12, and the disc push portion 21 of the push-forth member 11 is brought to be ready for pushing forth the edge of the disc D.

The rocking of the push-back member 12 eventually also brings the second disc receiving portion 22b of the push-back member 12 into contact with the edge of the disc D. Eventually, however, as shown in FIG. 11, the first disc receiving portion 22a is separated from the edge of the disc D, and the disc D consequently pushes the sole second disc receiving portion 22b.

As shown in FIG. 15C, when the push-back member 12 has rocked to the position shown in FIG. 11 and the contact portion 28 enters the orbit of rocking of the push portion 37, the first switch 42a is released from the pressure receiving portion 29 and turned off, whereupon the one-direction motor 19 (at position a in FIG. 24) is started.

The rotation member 17 receives the torque from the motor 19 thus started, and is rotated in the clockwise direction, thus pushing the contact portion 28 with the push portion 37 and causing counterclockwise rocking of the push-back member 12. The connecting member 13 and the push-forth member 11 follow the push-back member 12, and rock in the counterclockwise direction. The disc push portion 21 of the push-forth member 11 thus quickly pushes forth the disc D.

At this time, the connecting member 13 and the push-forth member 11 are held to be integral with each other merely elastically by the spring 14. Thus, the elastic force of the spring 14 neither affects the engagement relation between the cam groove 23 and the cam pin 24 nor constitutes any load on the one-direction motor 19. The push-back member 12, the connecting member 13 and the push-forth member 11 are thus smoothly moved.

Sometimes, the user may intend in fluster to pull out the disc D which is being brought forth by the driving force of the motor 19. In such a case, it is undesired if the disc can not be pulled out due to surpassing mechanical force or if the internal mechanism is damaged due to excessively strong pulling force.

Figure 25:
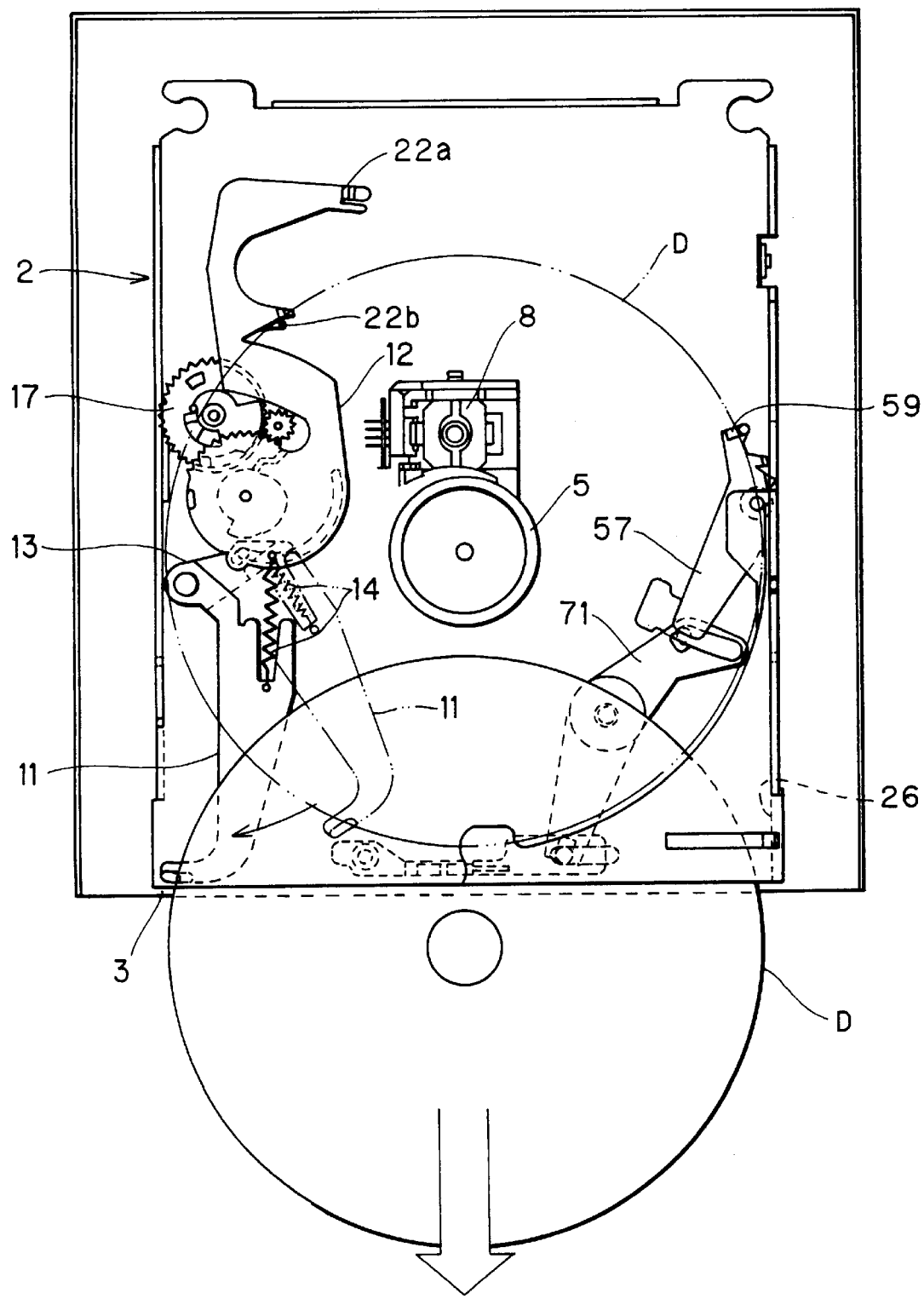
FIG. 25 is a plan view showing the disc player with a disc taken out during transfer thereof.

In the disc player as described above, the push-forth member 11 and the connecting member 13 are held integrally by the spring 14. Thus, when the user intends to pull out the disc D being brought forth toward the playing portion P by the diving force of the motor 19, the push-forth member 11 is pushed by the edge of the disc D and, as shown in FIG. 25, rocks away from the connecting member 13 while elongating the spring 14. The disc D thus can be pulled out safely without possibility of damaging the internal mechanism.

Besides, since the stopper 57 prohibits the descent of the clamper 6 until the disc D has been set in the play position, it is not possible the clamper which may otherwise be lowered makes it difficult to take out the disc D being inserted.

Right after the start of the one-direction motor 14, the second switch 42b is detached from the first angular hole 36a, and is pushed and turned on by the bottom surface of the rotation member 17. At this time, the one-direction motor 19 continues its rotation. (at position b in FIG. 24) In the meantime, the push pin 40b of the push member 40 is shifted from the first pressure receiving surface 29b of the pressure receiving portion 29 to the second pressure receiving surface 29c thereof, and applies counterclockwise torque to the push-back member 12.

When the disc D comes to a position to be concentric with the turntable 5, as shown in FIG. 12, the push portion 37 of the rotation member 17 is separated from the contact portion 28 of the push-back member 12, and the first arcuate surface 38 is in turn brought into contact with the contact surface 28.

At this time, the push-back member 12 suspends its rocking for a while. Also, the push pin 40b of the push member 40 is on the shoulder 29d of the pressure receiving member 13, and provides no torque to the push-back member 12. Furthermore, the cam pin 24 of the connecting member 13 is at a position in the cam groove 23 of the push-back member 12 near the end closer to the center of rocking.

Figure 26:
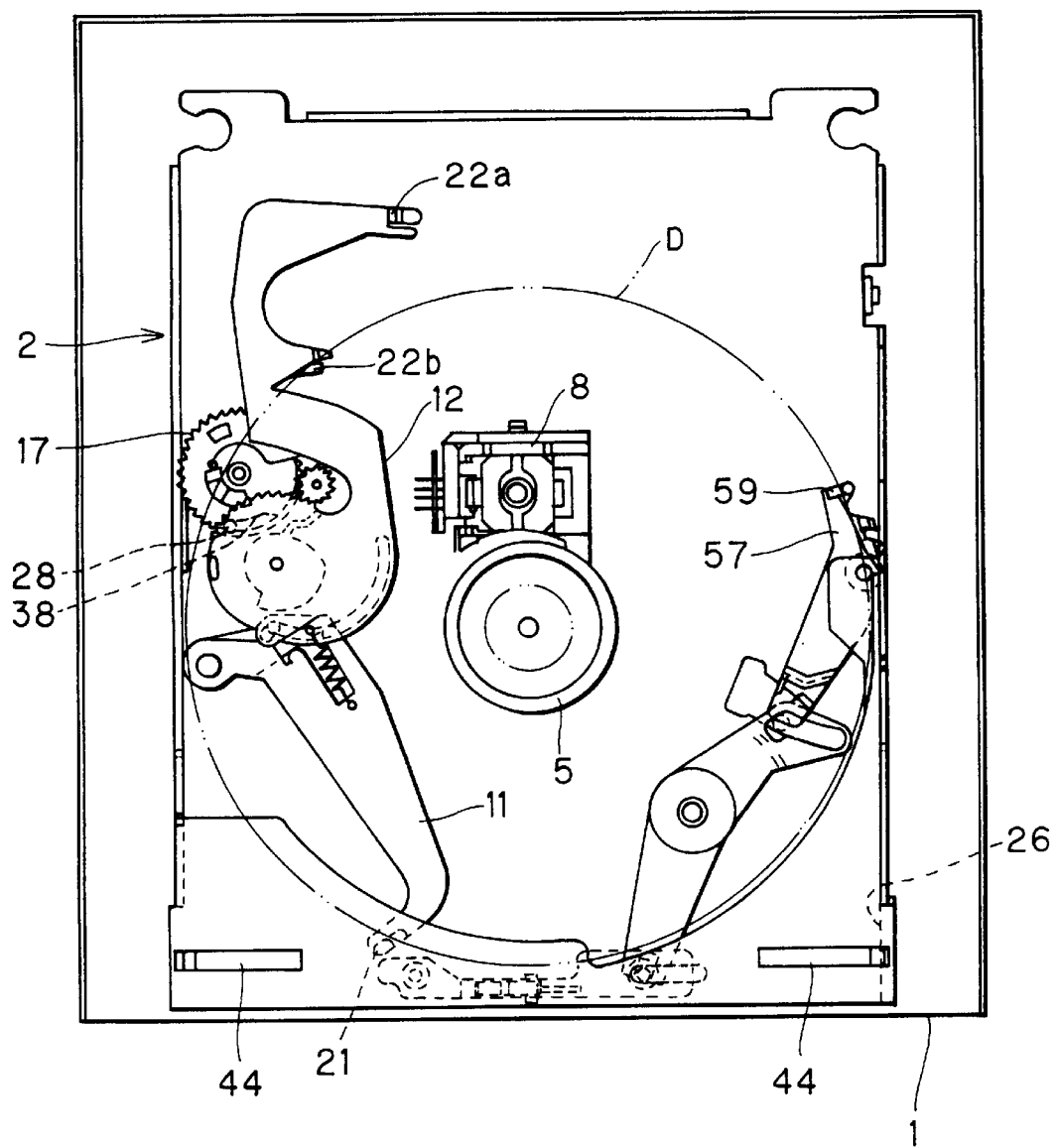
FIG. 26 is a plan view showing the relation among the push-forth and push-back members and the stopper.

When the disc D comes to a position to be capable of being held on the turntable 5, the edge of the disc D pushes the disc receiving portion 59 of the stopper 7. As a result, the preventing portion 62 of the stopper 57 departs from its position below the engagement portion 64, and this position is in turn assumed by the sliding contact portion 63. As shown in FIG. 26, the edge of the disc D is consequently held at three points by the disc push portion 21 of the push member 11, the second disc receiving portion 22b of the push-back member 12 and the disc receiving portion 59 of the stopper 57. While the first arcuate surface 38 is in contact with the contact portion 38, the push-back member 12 is suspending its rocking. During this time, the rotation member 17 is still continually rotated. The cam contact portion of the clamper supporting member 4 is thus eventually brought into contact with the clamper control cam 34 of the rotation member 17. As a result, the clamper supporting member 4 is caused to rock down to lower the clamper 6. The damper 6 thus comes to hold the disc D on the turntable 5 with its flange portion 54. During the downward rocking of the clamper supporting member 4, as shown in FIG. 21C, the engagement portion 64 slides on the sliding contact portion 63, thus causing movement of the stopper 57 to the retreated position to be out of contact with the edge of the disc D.

With further rotation of the one-direction motor 19, the contact point of the contact portion 28 is eventually shifted from the first arcuate portion 38 to the second arcuate portion 39. As a result, the push-back member 12 is caused to slightly rock again in the counterclockwise direction.

Figure 27:
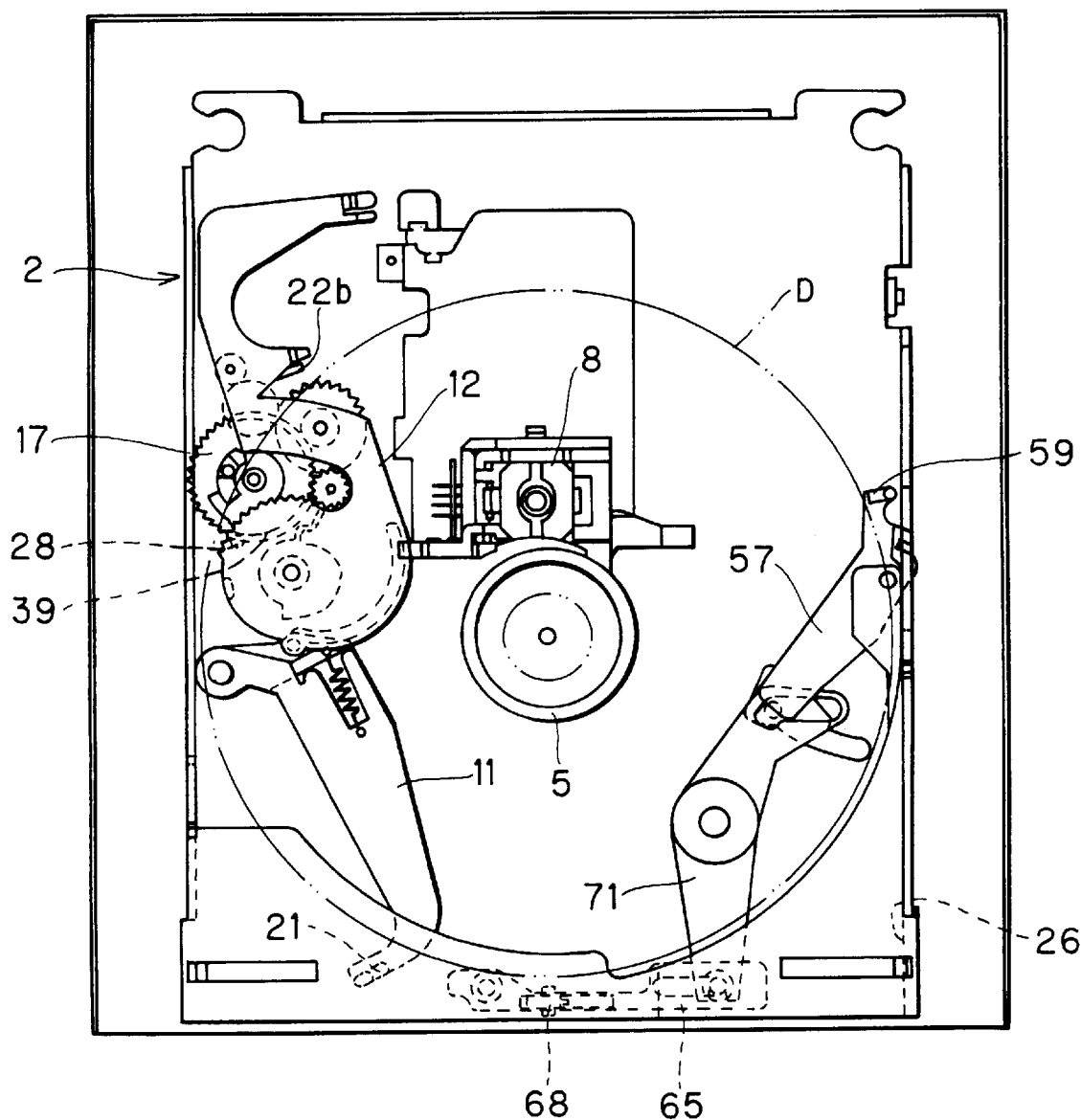
FIG. 27 is also a plan view showing the relationship among the push-forth and push-back members and the stopper.

As shown in FIG. 13, the counterclockwise rocking of the push-back member 12 causes the cam pin 24 of the connecting member 13 to be moved to the separating portion of the cam groove 23, causing slight clockwise rocking of the push-forth member 11. As shown in FIG. 27, the disc push portion 21 of the push-forth member 11 and the disc receiving portion 22b of the push-back member 12, following the disc receiving portion 59 of the stopper 57, are separated from the edge of the disc D. While the cam pin 24 is moved along the cam groove 23, the elastic force of the spring 14 neither affects the engagement relation between the cam pin 24 and the cam groove 23 nor constitutes any load on the one-direction motor 19.

At the time of separation of the disc receiving portion 59 from the edge of the disc D with the downward rocking of the clamper supporting member 4, the stopper 59 is caused to rock, thus causing the engagement pin 60 to move along the elongate hole 73 in the intermediate member 71 and eventually come to push the other end of the elongate hole 73. As a result, the intermediate member 71 is caused to rock in the clockwise direction, thus causing rightward movement of the slide 65 against the force of the spring 67. As shown in FIG. 23, the double insertion prohibit member 68 is thus brought to its upright position.

When the second angular hole 36b of the rotation member 17 comes to the position of the second switch 42b, the second switch 42b is released from the rotation member 17 and turned off, thus stopping the one-direction motor 19 (at position c in FIG. 24).

Then, the motor 7 of the playing portion P is started to cause rotation of the turntable 5, the damper 6 and the disc D in unison with one another, while the pick-up 8 is also operated. Data recorded in the disc D is thus played back.

There may occur a circumstance when the user intends by mistake to insert other disc during the above playback operation. In such a case, the other disc being inserted may be brought into contact with and damage the inner disc D under rotation or cause damage to the internal mechanism. In the disc player of the present invention as described herein, the double insertion prohibit member 68 is held upright on the passage 9 of the disc D and prohibits the insertion of other disc during the playback operation. It is thus possible to eliminate the possibility of doubly inserting a disc and causing damage to the disk and the internal mechanism due to otherwise possible double insertion.

When the operation of unloading the disc D is caused by stopping the playback operation, an ejection switch (not shown) is turned on to start the one-direction motor 19 (at position d in FIG. 24) again.

The re-start of the one-direction motor 19 causes the clamper control cam 34 to be separated downward from the cam contact portion 49. As a result, the clamper supporting member 4 is caused to rock upward and raise the damper 6. At this time, the stopper 57 is released from the engagement portion 64 and restored to the initial position by the torsion spring 61, thus bringing its disc receiving portion 59 into contact with the edge of the disc D. Also, the slide 65 is restored by the spring 67, causing rocking of the double insertion prohibit member 68 to a position beneath the passage 9 of the disc D.

Right after the re-start of the one-direction motor 19, the second switch 42b is detached from the second angular hole 36 of and turned on by the rotation member 17. At this time, the motor 19 (at position e in FIG. 24) is continually rotated. In the meantime, the partial gear 31 of the rotation member 17 is brought into mesh with the idler gear 18. Since the idler gear 18 is normally in mesh with the gear portion 27 of the push-back member 12, the torque of the motor 19 is thus the gear portion 27 of the push-back member 12, thus causing clockwise rocking thereof and bringing the second disc receiving portion 22b into contact with the edge of the disc D. At the same time, the cam pin 24 of the connecting member 13 leaves the separating portion 23a and causes slight counterclockwise rocking of the push-forth member 11, thus also bringing the disc push portion 21 of the push-forth member 11 into contact with the edge of the disc D.

Figure 28:
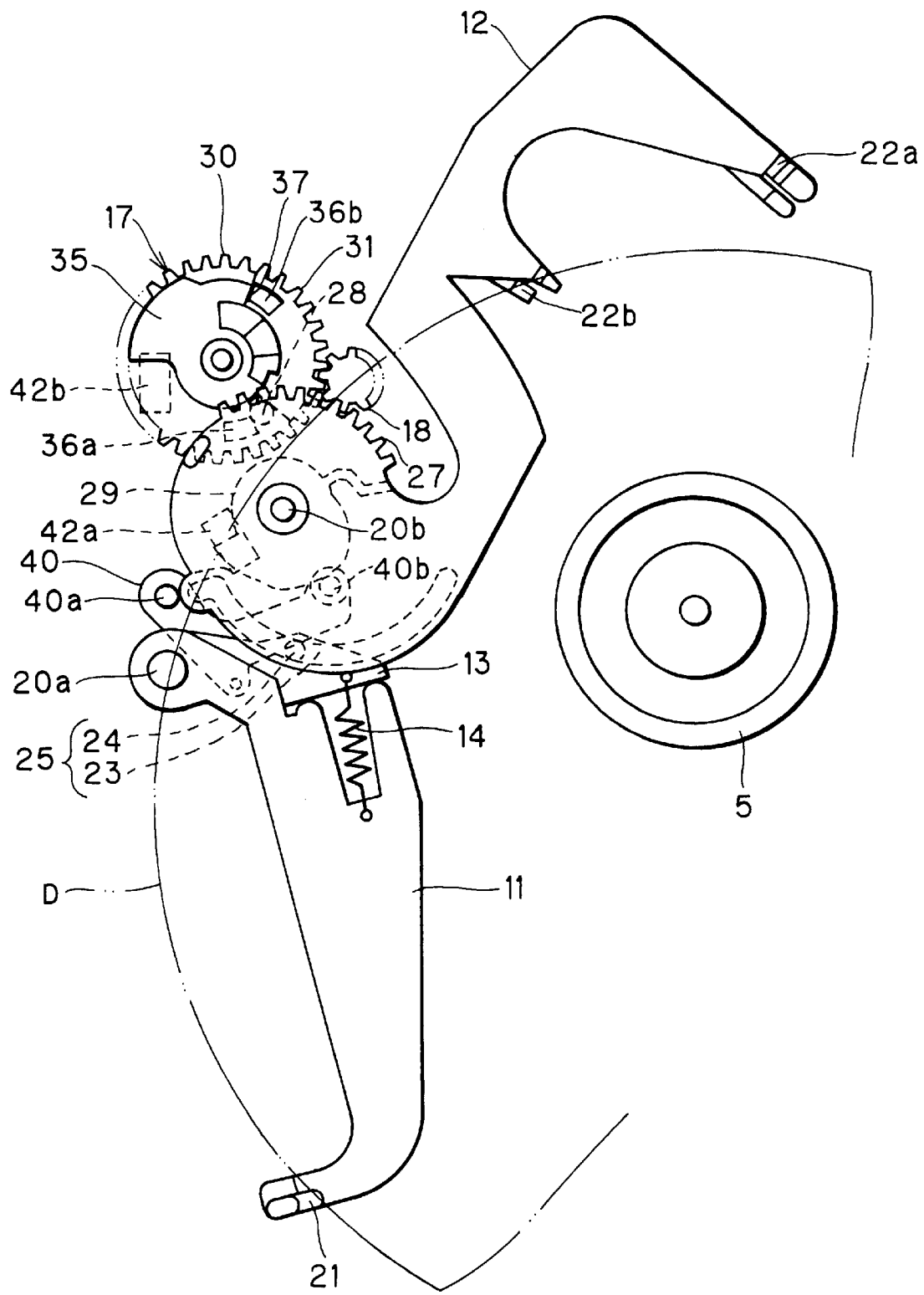
FIG. 28 is a plan view showing the relationship among the rotation member, the idler gear and the push-forth and push-back members.

As the clockwise rocking of the push-forth member 11 proceeds in this state, as shown in FIG. 28, the disc D is pushed back from the playing portion P toward the disc insertion slot 3 by the second disc receiving portion 22b and subsequently by the first disc receiving portion 22a replacing the second one. In this operation, the disc is transferred relatively slowly compared to the speed in the disc loading operation although the rotation speed of the motor 19 is constant. This is so because in the disc unloading operation the disc is transferred via the train of the partial gear 31, the idler gear 18 and the gear portion 27 meshed with one another, while in the disc loading operation it is transferred with the contact portion 28 of the push-back member 12 pushed by the push portion 37 of the rotation member 17.

When the pressure receiving portion 29 of the push-back member 12 comes to the position above the first switch 42a again, the switch 42a is turned on (at position f in FIG. 24).

When the disc D has been pushed back by the first disc receiving portion 22a of the push-back member 12 up to a position with its center hole fully exposed on the outside of the disc insertion slot 3, the cam pin 24 of the connecting member 13 is caused to move along the cam groove 23 from a position thereof close to the rocking center to a position near the end remote from the rocking center. As a result, the disc push portion 21 of the push-forth member 11 is restored to a position in the neighborhood of the left end of the disc insertion slot 3.

Also, the first angular hole 36a of the rotation member 12a comes again to be above and turns on the second switch 42b, thus stopping the one-direction motor 19 (at position g in FIG. 24).

The edge of the disc D is pushed back by the push-back member 12 while being elastically held between the elastic retainers 44 and the inclined surface portions 9a, so that it does not get out or down from the disc player although it is brought to a position that more than one half of it projects from the disc player to the outside. The disc D at this position can be readily taken out by inserting fingers into its center hole.

Figure 29:
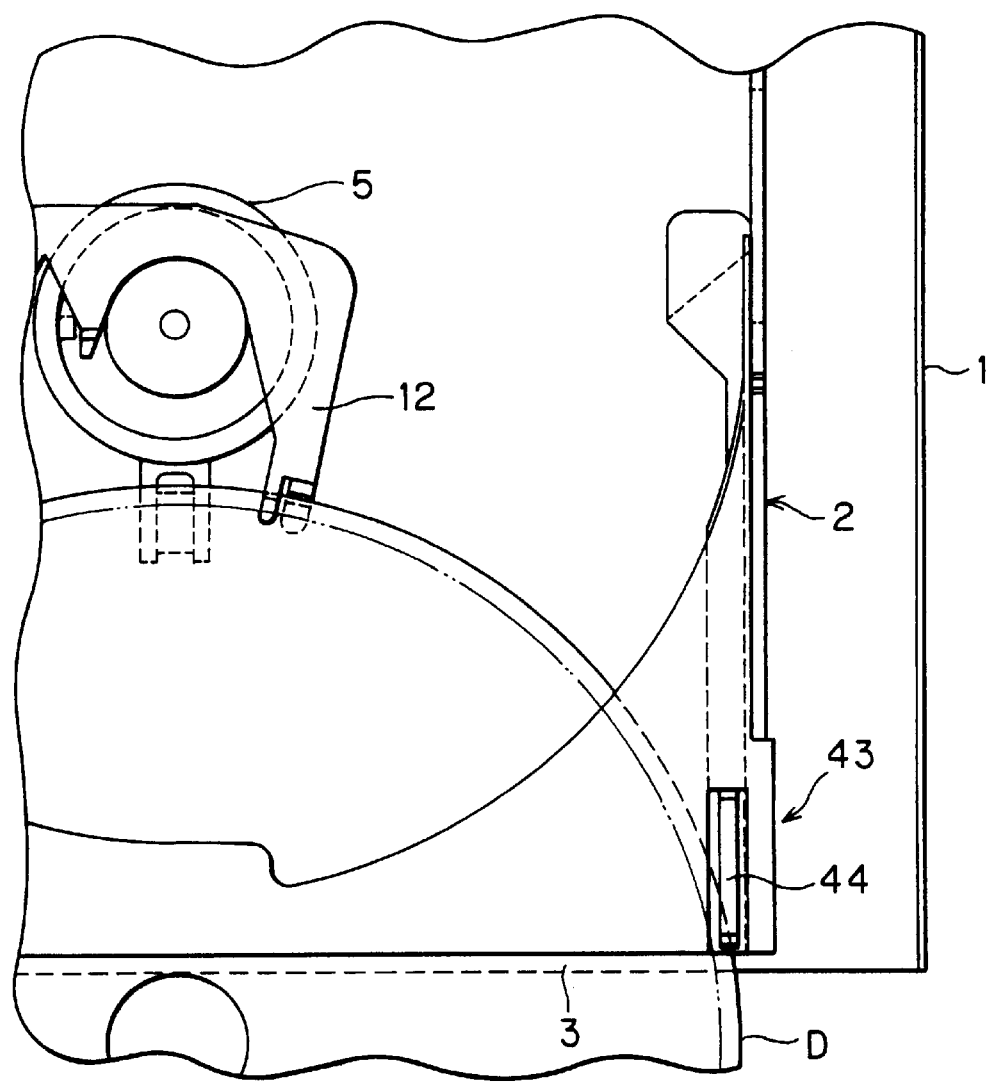
FIG. 29 is a fragmentary plan view showing a second embodiment of the invention.
Figure 30:
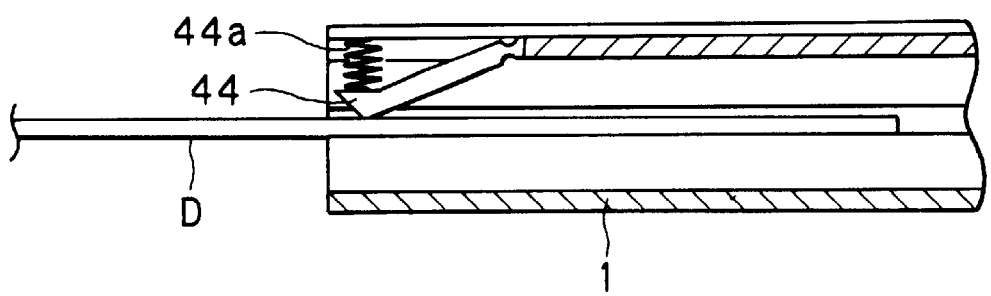
FIG. 30 is a partial sectional view of FIG. 29 taken from the right side thereof.

FIGS. 29 and 30 show a second embodiment of the invention. In the Figures, parts like those in the first embodiment are designated by like reference numerals. The elastic regainers 44 of the elastic holding mechanism 43 are elongate in the direction of movement of the disc D, and they are biased downward by auxiliary springs 44a.

In this case, the end of each of the auxiliary springs 44a retains from above a portion of the disc D that can be held between as shown in FIG. 18, and the same effects as in the first embodiment can be obtained.

Figure 31:
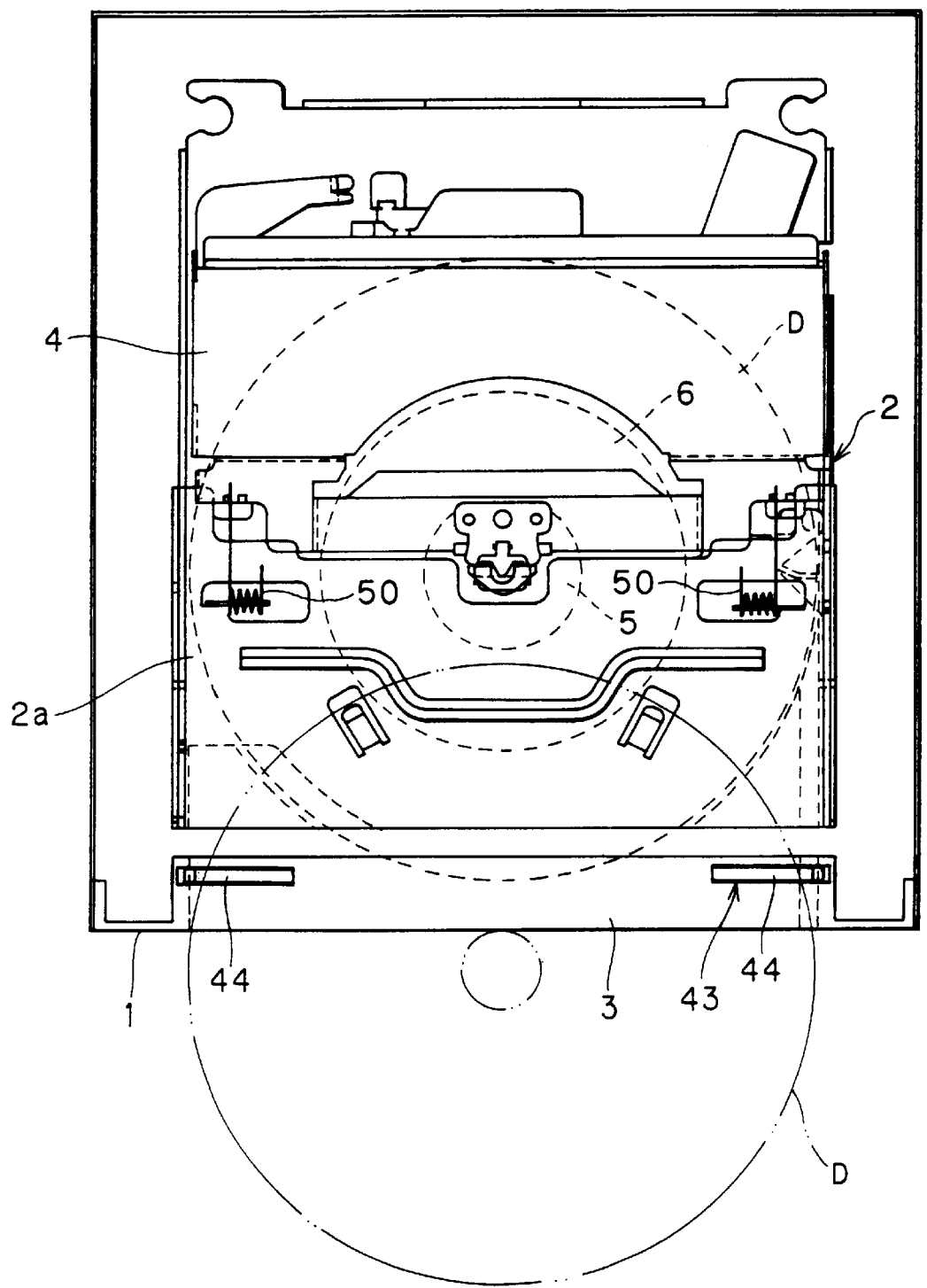
FIG. 31 is a plan view showing a third embodiment of the invention.

FIG. 31 shows a third embodiment of the invention. In the Figure, parts like those in the first and second embodiments are designated by like reference numerals. In this embodiment, the elastic retainers 44 of the elastic holding mechanism 43 are formed on a front end portion of cabinet 1 made of a synthetic resin.

Again in this case, the same effects as in the first embodiment shown in FIGS. 1 to 28 can be obtained.

As has been described in the foregoing, the disc player according to the invention permits size reduction with the playing portion P disposed near the disc insertion slot 3. In the unloading of the disc D, the transfer means 10 pushes back the edge of the disc D up to a position, at which the center hole of the disc D at least partly projects from the disc insertion slot 3, but the elastic holding mechanism 43 elastically holds a portion of the disc D, having been pushed back by the transfer means 10, on the outer side of the recording area from the opposite sides of the disc D, so that the disc D will not get out to the outside although it is pushed back thereto by more than one half.

The disc D having been pushed back thus can be readily taken out by holding the disc on the inner side thereof other than the recording area from both sides with fingers or by inserting fingers through the center hole thereof.

In addition, the use of the elastic retainers having an inclined surface relative to the plane of the disc such as to retain the edge of the disc, having been pushed back by the transfer means 10, with the inclined surfaces, permits increasing the scope of selection of the disposing position of the elastic holding mechanism and hence increasing the degree of freedom of design.

The formation of the elastic retainers to be of the disc insertion slot, also permits reducing the number of components and hence reducing the cost of manufacture. Furthermore, the pair of elastic retainers 44 disposed symmetrically on the opposite sides of the passage of the disc D, offer equal resistance to the insertion of the disc, and the disc can be inserted in a transversely well-balanced state and without possibility of meandering.

What is claimed is:

1. A disc player having a playing portion disposed near a disc insertion slot for playback with a disc at a position assumed when the entirety thereof is inserted through a passage slightly from the disc insertion slot, said disc extending along a plane having a recording area and an outer side surface along a peripheral edge of said disc, comprising:

transfer means for pushing back the disc at the edge thereof from the playing portion up to a position, at which the center hole of the disc at least partly projects from the disc insertion slot;

an elastic holding mechanism disposed inside the disc player and the disc insertion slot and held out of contact with the disc loaded in the playing portion and serving to elastically hold the disc, having been pushed back by the trasfer means from the playing portion torward the disc insertion slot, said mechanism being adapted to hold said disc by engagement with said outer side surface of said disc, on opposite sides of said disc.

2. The disc player according to claim 1, wherein said elastic holding mechanism has an elastic retainer which is provided with a first inclined surface inclined relative to said plane of said disc, said elastic retainer being adapted to elastically hold said disc by engagement with said outer side surface of said disc.

3. The disc player according to claim 2, wherein said elastic retainer is formed as a portion integral with a synthetic resin portion in the neighborhood of the disc insertion slot.

4. The disc player according to claim 2, wherein said elastic holding mechanism has a pair of elastic retainers disposed symmetrically on the opposite sides of the passage of the disc.

5. The disc player according to claim 2, wherein said elastic holding mechanism further includes a wall within said passage having a second inclined surface inclined relative to said plane of said disc, and disposed opposite of said first inclined surface of said elastic retainer, and spring means for biasing said elastic retainer toward said second inclined surface of said wall, said second inclined surface being adapted to engage said outer side surface of said disc.

* * * * *